United States Patent
Tseng et al.

(10) Patent No.: US 12,477,409 B2
(45) Date of Patent: Nov. 18, 2025

(54) IMPLEMENTING THE IDLE MODE WHILE OUT OF A RAN COVERAGE AREA

(71) Applicant: SHARP KABUSHIKI KAISHA, Sakai (JP)

(72) Inventors: Yung-Lan Tseng, Taipei (TW);
Chien-Chun Cheng, Taipei (TW);
Hung-Chen Chen, Taipei (TW);
Yen-Hua Li, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 472 days.

(21) Appl. No.: 17/881,167

(22) Filed: Aug. 4, 2022

(65) Prior Publication Data
US 2023/0047987 A1 Feb. 16, 2023

Related U.S. Application Data

(60) Provisional application No. 63/203,922, filed on Aug. 4, 2021.

(51) Int. Cl.
*H04W 36/00* (2009.01)
*H04W 36/08* (2009.01)
(Continued)

(52) U.S. Cl.
CPC ....... *H04W 36/0058* (2018.08); *H04W 36/08* (2013.01); *H04W 36/322* (2023.05);
(Continued)

(58) Field of Classification Search
CPC . H04W 36/0058; H04W 76/20; H04W 76/30; H04W 36/322; H04W 36/08; H04W 84/06
See application file for complete search history.

(56) References Cited

U.S. PATENT DOCUMENTS

| 11,917,579 B2 * | 2/2024 | Jia .......................... H04W 68/02 |
| 2013/0157661 A1 * | 6/2013 | Bhaskaran ............ H04W 60/00 455/436 |

(Continued)

FOREIGN PATENT DOCUMENTS

| CN | 113196810 A | 7/2021 |
| WO | 2020076220 A1 | 4/2020 |

OTHER PUBLICATIONS

Huawei, HiSilicon, "Discussion on mobility enhancement for IoT NTN", R2-2105663, 3GPP TSG RAN WG2 #114-e Electronic Meeting, May 19-27, 2021, Sections 2-3.

(Continued)

*Primary Examiner* — Michael Thier
*Assistant Examiner* — Tracy Lauren Raimondo
(74) *Attorney, Agent, or Firm* — ScienBiziP, P.C.

(57) ABSTRACT

A method for a user equipment (UE) connected to a serving Radio Access Network (RAN) through a serving cell is provided. The serving RAN may include a Non-Terrestrial Network (NTN). The method receives, from the serving cell, satellite information regarding a coverage area of the serving RAN. After receiving the satellite information, the method determines, based on the satellite information, that the UE will be disconnected from the serving RAN by moving out of the coverage area of the serving RAN after a specific period of time. The method maintains an Access Stratum (AS) layer configuration of the UE without performing any task associated with an Idle mode of the UE while the UE is staying out of the coverage area of the serving RAN.

20 Claims, 6 Drawing Sheets

(51) Int. Cl.
*H04W 36/32* (2009.01)
*H04W 76/20* (2018.01)
*H04W 76/30* (2018.01)
*H04W 84/06* (2009.01)

(52) U.S. Cl.
CPC ........... *H04W 76/20* (2018.02); *H04W 76/30* (2018.02); *H04W 84/06* (2013.01)

(56) References Cited

U.S. PATENT DOCUMENTS

| | | | |
|---|---|---|---|
| 2020/0196375 A1* | 6/2020 | Ryu | H04W 76/34 |
| 2020/0260512 A1* | 8/2020 | Cheng | H04W 80/02 |
| 2021/0377825 A1 | 12/2021 | Deenoo et al. | |
| 2022/0070749 A1* | 3/2022 | Wang | H04W 36/0085 |
| 2022/0337310 A1* | 10/2022 | Wei | H04B 7/1851 |
| 2023/0023556 A1* | 1/2023 | Agiwal | H04L 5/0053 |
| 2024/0236843 A1* | 7/2024 | Catovic | H04B 7/18513 |

OTHER PUBLICATIONS

Lenovo, Motorola Mobility, "Potential issues in IoT NTN with discontinuous coverage", R2-2103411, 3GPP TSG-RAN WG2 Meeting #113 bis electronic Online, Apr. 12-20, 2021, Sections 2-3.

Gatehouse, Sateliot, ESA, "Mobile-Termination with non-continuous coverage in NTN", R2-2105860, 3GPP TSG RAN WG2 meeting #114 Electronic Meeting, May 19-27, 2021.

3GPP TS 38.331, "3rd Generation Partnership Project; Technical Specification Group Radio Access Network; NR; Radio Resource Control (RRC) protocol specification (Release 16)", V16.5.0 (Jun. 2021).

3GPP TS 38.304, "3rd Generation Partnership Project; Technical Specification Group Radio Access Network; NR; User Equipment (UE) procedures in Idle mode and RRC Inactive state (Release 16)", V16.5.0 (Jun. 2021).

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 16)", V16.5.0 (Jun. 2021).

3GPP TS 38.133, "3rd Generation Partnership Project; Technical Specification Group Radio Access Network; NR; Requirements for support of radio resource management (Release 16)", V16.8.0 (Jun. 2021).

* cited by examiner

IMPLEMENTING THE IDLE MODE WHILE OUT OF A RAN COVERAGE AREA

CROSS-REFERENCE TO RELATED APPLICATION(S)

The present application claims the benefit of and priority to U.S. Provisional Patent Application Ser. No. 63/203,922, filed on Aug. 4, 2021, entitled "SERVICE AVAILABLE PERIOD DESIGN FOR NON-TERRESTRIAL COMMUNICATION NETWORK," the content of which is hereby incorporated fully by reference herein into the present disclosure.

FIELD

The present disclosure generally relates to wireless communications, and more particularly, to a user equipment (UE) and a method of the UE to determine how to implement the UE's Idle mode during a Service Available Period (SAP) and/or while out of a RAN coverage area of a cell connected to a Non-Terrestrial Network (NTN).

BACKGROUND

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

5G NR is envisioned to substantially improve the capability and efficiency in Non-Terrestrial Networks (NTNs). An NTN refers to a network, or segments of a network, that uses a spaceborne vehicle for data transmission, for example, using one or more Low Earth Orbiting (LEO) satellites and/or one or more Geostationary Earth Orbiting (GEO) satellites. The possible reference scenarios and architecture options for NTNs may be identified in the 3rd Generation Partnership Project (3GPP) specifications. For example, in 3GPP NTN working item (WI), a 3GPP class 3 user equipment (UE) with Global Navigation Satellite System (GNSS) capability for identifying the UE's location is addressed.

Many other related areas, however, still require more discussion and/or need additional improvements. As an example, how to handle a service available, or non-available, period (e.g., while the UE is in-coverage or out-of-coverage area), such as how to implement a UE's Idle mode (e.g., while the UE is out of a coverage area of a satellite), is one of the areas that requires additional discussion and more improvement.

SUMMARY

As discussed above, the present disclosure is directed to a UE and a method of the UE to determine how to implement a UE's Idle mode while the UE is out of a RAN coverage area in a Non-Terrestrial Network (NTN).

In a first aspect of the present disclosure, a method for a user equipment (UE) connected to a serving Radio Access Network (RAN) through a serving cell is provided. The serving RAN includes a Non-Terrestrial Network (NTN). The method receives, from the serving cell, satellite information regarding a coverage area of the serving RAN. After receiving the satellite information, the method determines, based on the satellite information, that the UE will be disconnected from the serving RAN by moving out of the coverage area of the serving RAN after a specific period of time. The method maintains an Access Stratum (AS) layer configuration of the UE without performing any task associated with an Idle mode of the UE while the UE is staying out of the coverage area of the serving RAN.

In an implementation of the first aspect, the satellite information is associated with a satellite that configures the serving cell of the UE and indicates at least one of a RAN or Radio Access Technology (RAT) or cell service available period, and a RAN or RAT or cell service unavailable period.

In another implementation of the first aspect, the method further includes receiving the AS layer configuration via UE-specific control signaling before the UE moves out of the coverage area of the serving RAN.

In another implementation of the first aspect, the AS layer configuration includes one or more cell selection priorities associated with one or more frequency carriers. The UE-specific control signaling includes a radio resource control (RRC) Release message. The RRC Release message instructs the UE to move to the Idle mode.

In another implementation of the first aspect, the AS layer configuration further includes UE inactive AS context, and the UE inactive AS context is stored at the UE after receiving the RRC Release message.

In another implementation of the first aspect, maintaining the AS layer configuration includes maintaining an Inactive state context for the AS layer that is stored at the UE. The one or more cell selection priorities include priority information for selecting, while the UE is in the Idle mode, a second serving cell to connect to the NTN. The second serving cell is associated with a second satellite of the NTN. The second satellite is different from a first satellite of the NTN that is associated with the serving cell.

In another implementation of the second aspect, maintaining the AS layer configuration includes maintaining an Inactive state context for the AS layer that is stored at the UE. The one or more cell selection priorities may include priority (e.g., with/without sub-priority) information for selecting, while the UE is in the Idle mode, a second serving cell to connect to a Terrestrial Network (TN). The second serving cell may be associated with a base station of the TN (e.g., and not the original (or first) base station associated with the NTN). The base station of the TN may be different from a satellite of the NTN (e.g., that is associated with the serving cell). Please also note that, in some implementations, a TN or an NTN may share the same frequency carrier and as such, in some implementations, different priority (and sub-priority) values may be configured for the same frequency carrier. For example, a first priority value may be associated with the TN selection and a second (different) priority value may be associated with the NTN selection. In some implementations, one priority value (e.g., associated with the same frequency carrier) may be applied to both TN and NTN cell (re)selection.

In another implementation of the first aspect, the method further includes receiving the AS layer configuration via UE-specific control signaling and storing the AS layer configuration which includes at least one of a log measurement configuration or log measurement results before moving out of the coverage area of the serving RAN.

In another implementation of the first aspect, the method further includes performing at least one task associated with the Idle mode of the UE after moving to another coverage area of the serving RAN.

In another implementation of the first aspect, the Idle mode task comprises a RAN notification Area Update procedure.

In another implementation of the first aspect, the Idle mode includes one of an E-UTRA or New Radio (NR) RRC Inactive state and an E-UTRA or NR RRC Idle state. A task associated with the Idle mode of the UE includes a task associated with an E-UTRA RAT or a task associated with an NR RAT.

In a second aspect, a UE is provided. The UE includes one or more non-transitory computer-readable media storing computer-executable instructions. The UE also includes at least one processor coupled to the one or more non-transitory computer-readable media, and configured to execute the computer-executable instructions to receive, from a serving cell, satellite information regarding a coverage area of a serving Radio Access Network (RAN) including the NTN. The UE is further configured to determine, based on the satellite information, that the UE will be disconnected from the serving RAN by moving out of the coverage area of the serving RAN after a specific period of time. The UE is further configured to maintain an Access Stratum (AS) layer configuration of the UE without performing any task associated with an Idle mode of the UE while the UE is staying out of the coverage area of the serving RAN.

In an implementation of the second aspect, the satellite information is associated with a satellite that configures the serving cell of the UE and indicates at least one of a RAN or Radio Access Technology (RAT) or cell service available period, and a RAN or RAT or cell service unavailable period.

In another implementation of the second aspect, the processor is further configured to receive the AS layer configuration via UE-specific control signaling before the UE moves out of the coverage area of the serving RAN.

In another implementation of the second aspect, the AS layer configuration includes one or more cell selection priorities associated with one or more frequency carriers, the UE-specific control signaling includes a radio resource control (RRC) Release message, and the RRC Release message instructs the UE to move to the Idle mode.

In another implementation of the second aspect, the AS layer configuration further includes UE inactive AS context, and the UE inactive AS context is stored at the UE after receiving the RRC Release message.

In another implementation of the second aspect, maintaining the AS layer configuration includes maintaining an Inactive state context for the AS layer that is stored at the UE. The one or more cell selection priorities comprise priority information for selecting, while the UE is in the Idle mode, a second serving cell to connect to the NTN. The second serving cell is associated with a second satellite of the NTN. The second satellite is different from a first satellite of the NTN that is associated with the serving cell.

In another implementation of the second aspect, maintaining the AS layer configuration includes maintaining an Inactive state context for the AS layer that is stored at the UE. The one or more cell selection priorities comprise priority (e.g., with/without sub-priority) information for selecting, while the UE is in the Idle mode, a second serving cell to connect to a Terrestrial Network (TN). The second serving cell may be associated with a base station of the TN (e.g., and not the original (or first) base station associated with the NTN). The base station of the TN may be different from the satellite of the NTN (e.g., that is associated with the serving cell). Please also note that, in some implementations, a TN or an NTN may share the same frequency carrier and as such, in some implementations, different priority (and sub-priority) values may be configured for the same frequency carrier. For example, a first priority value may be associated with the TN selection and a second (different) priority value may be associated with the NTN selection. In some implementations, one priority value (e.g., associated with the same frequency carrier) may be applied to both TN and NTN cell (re)selection.

In another implementation of the second aspect, the processor is further configured to receive the AS layer configuration via UE-specific control signaling and store the AS layer configuration which includes at least one of a log measurement configuration or log measurement results before moving out of the coverage area of the serving RAN.

In another implementation of the second aspect, the processor is further configured to determine how to implement one or more timers associated with the Idle mode of the UE while the UE is staying out of the coverage area of the serving RAN.

In another implementation of the second aspect, the processor is further configured to perform at least one task associated with the Idle mode of the UE after moving to another coverage area of the serving RAN.

In another implementation of the second aspect, the Idle mode task includes a RAN notification Area Update procedure.

In another implementation of the second aspect, the Idle mode includes one of an E-UTRA or New Radio (NR) RRC Inactive state and an E-UTRA or NR RRC Idle state. A task associated with the Idle mode of the UE includes a task associated with an E-UTRA RAT or a task associated with an NR RAT.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
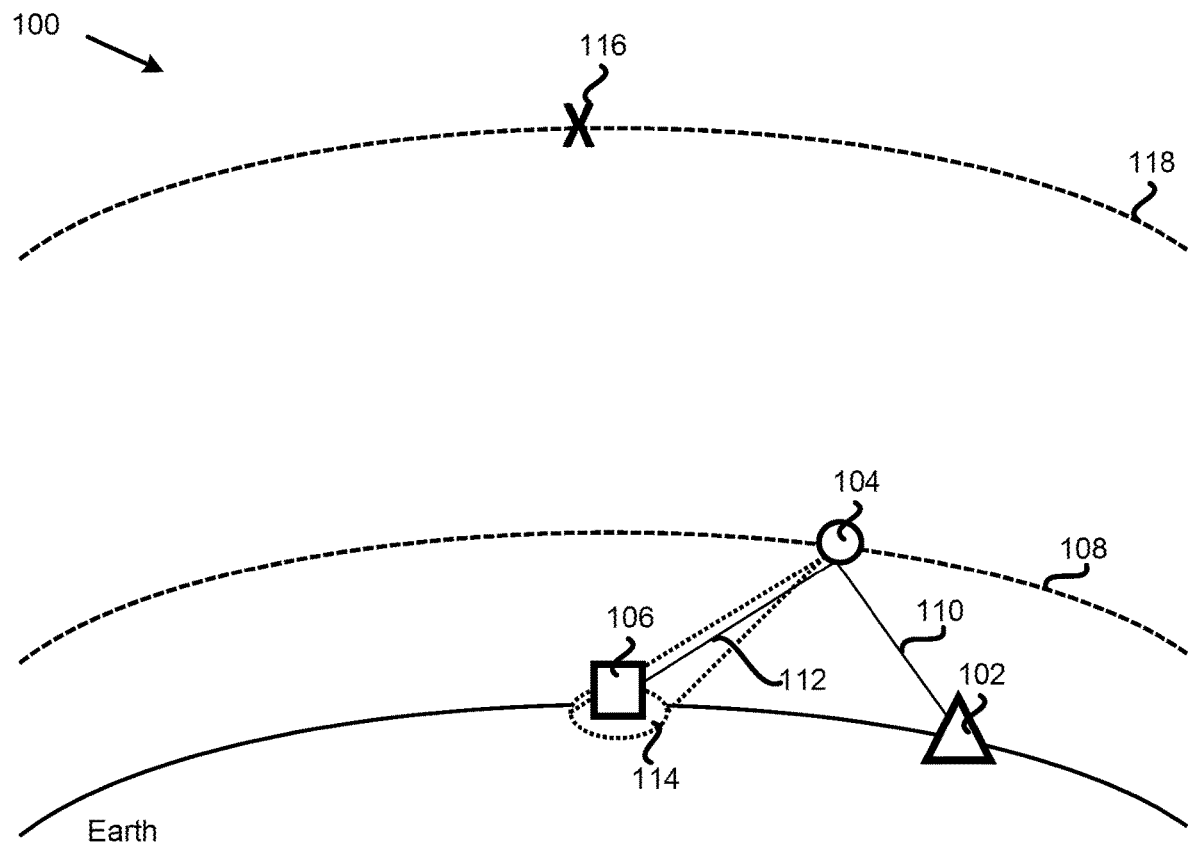
FIG. 1 is a diagram illustrating wireless communication in an NTN based on a transparent payload, according to an example implementation of the present disclosure.

Some of the acronyms in the present disclosure are defined as follows and unless otherwise specified, the acronyms have the following meanings:

Acronym Full name
3GPP $3^{rd}$ Generation Partnership Project
5G $5^{th}$ Generation
5GC 5G Core
ARFCN Absolute Radio-Frequency Channel Number
AS Access Stratum
BS Base Station
BWP Bandwidth Part
CA Carrier Aggregation
CAG Closed Access Group
CN Core Network
CU Central Unit
DAPS Dual Active Protocol Stack
DC Dual Connectivity
DCI Downlink Control Information
DL Downlink
DU Distributed Unit
E-UTRA(N) Evolved Universal Terrestrial Radio Access (Network)
EN-DC E-UTRA NR Dual Connectivity
EPC Evolved Packet Core
FR Frequency Range
IAB Integrated Access and Backhaul
ID Identifier
IE Information Element
LAN Local Area Network
LTE Long Term Evolution
MAC Medium Access Control
MAC CE MAC Control Element
MCG Master Cell Group
MIB Master Information Block
MN Master Node
MSG Message
MT Mobile Termination
MTC Measurement Timing Configuration
NAS Non-Access Stratum
NE-DC NR—E-UTRA Dual Connectivity
NPN Non-Public Network
NR New Radio
NR-U NR Unlicensed
NW Network
PBCH Physical Broadcast Channel
Pcell Primary Cell
PCI Physical Cell Identity
PDCCH Physical Downlink Control Channel
PDSCH Physical Downlink Shared Channel
PDU Protocol Data Unit
PHY Physical (layer)
PLMN Public Land Mobile Network
PNI-NPN Public Network Integrated Non-Public Network
PRACH Physical Random Access Channel
PSCell Primary SCG Cell/Primary Secondary Cell
PUCCH Physical Uplink Control Channel
PUSCH Physical Uplink Shared Channel
RA Random Access
RAN Radio Access Network
RAR Random Access Response
RAT Radio Access Technology
RF Radio Frequency
RNTI Radio Network Temporary Identifier
RRC Radio Resource Control
RS Reference Signal
RSRP Reference Signal Received Power
RSSI Received Signal Strength Indicator
Scell Secondary Cell
SCG Secondary Cell Group
SI System Information
SIB System Information Block
SL Sidelink
SMTC SS/PBCH Block Measurement Timing Configuration
SN Secondary Node
SNPN Stand-alone Non-Public Network
SSB Synchronization Signal Block
TS Technical Specification
UE User Equipment
UL Uplink
V2X Vehicle-to-Everything The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in some implementations," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency (e.g., "based on", "more specifically", "in some implementations", "in one alternative", "in one example", "in one aspect", or etc.) in the present disclosure is just one possible example in which would not restrict the specific method. One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)- bullet, point, action, behavior, term, alternative, aspect, example, implementation, or claim described in the present disclosure, "X/Y" may include the meaning of "X or Y". According to any sentence, paragraph, (sub)-bullet, point, action, behavior, term, alternative, aspect, example, implementation, or claim described in the present disclosure, "X/Y" may also include the meaning of "X and Y". According to any sentence, paragraph, (sub)-bullet, point, action, behavior, term, alternative, aspect, example, implementation, or claim described in the present disclosure, "X/Y" may also include the meaning of "X and/or Y".

The following terminologies are defined but are not necessarily limited to the meaning provided below so as far as to indicate open-ended inclusion or membership in the so-described meaning and the equivalent thereof.

In some implementations, an SDT may be a UL data transmission by a UE in an RRC_INACTIVE state. Packet size (or data volume) of the UL data may be lower than a specified threshold in some such implementations. In some implementations, the UL data of an SDT may be transmitted during an SDT procedure. In some implementations, the UL data of an SDT may be transmitted via an Msg 3 (e.g., based on a 4-step RA), via an MsgA (e.g., based on a 2-step RA), and/or via a CG resource (e.g., CG type 1). In some implementations, the UL data of an SDT may be transmitted based on a dynamic scheduling and/or a semi-persistent scheduling when the UE is in an RRC_INACTIVE state.

In some implementations, a NW may be a network node, a TRP, a cell (e.g., an SpCell, Pcell, PSCell, and/or an Scell), an eNB, a gNB, and/or a base station.

The terms "initiate", "trigger", and/or "start", may be interchangeably used in some implementations of the present disclosure. The terms "terminate", "stop", "release", "suspend", "discard", "end", "complete", "abort", and/or "cancel", may be interchangeably used in some implementations of the present disclosure. The terms "period", "process", and/or "duration" may be interchangeably used in some implementations of the present disclosure. The terms "resource" and/or "occasion" may be interchangeably used in some implementations of the present disclosure. Additionally, the terms "ongoing", "running", and/or "pending" may be interchangeably used in some implementations of the present disclosure.

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art may immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable media, such as memory or other types of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations described in this specification are oriented to software installed and executed on computer hardware, nevertheless, alternative example implementations implemented as firmware or as hardware or combination of hardware and software are well within the scope of the present disclosure.

The computer readable medium includes, but is not limited to, Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet) through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. In some implementations, a UE may be referred to as a PHY/MAC/RLC/PDCP/SDAP/RRC entity. Similarly, a PHY/MAC/RLC/PDCP/SDAP/RRC entity may be referred to a UE. The UE is configured to receive and transmit signals over an air interface from/to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure is not limited to the above-mentioned entities/protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to the network to serve the one or more UEs through a radio interface.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage, for example, each cell may schedule the Downlink (DL) and optionally Uplink (UL) resources to at least one UE within its radio coverage for DL and optionally UL packet transmission. The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell).

A cell or a serving cell may include a Primary Cell (Pcell), a Primary SCG Cell (PSCell), or a Secondary Cell (Scell). The serving cell may be an activated or a deactivated serving cell. For Dual Connectivity operation, the term Special Cell (SpCell) refers to the Pcell of the MCG (Master Cell Group) or the PSCell of the SCG (Secondary Cell Group) depending on if the MAC entity is associated to the MCG or the SCG, respectively. Otherwise, the term Special Cell refers to the Pcell.

The Pcell may refer to the SpCell of an MCG. The PSCell may refer to the SpCell of an SCG. MCG may refer to a group of serving cells associated with the Master Node (MN), including the SpCell and optionally one or more Scells. An SCG may refer to a group of serving cells associated with the Secondary Node (SN), including the SpCell and optionally one or more Scells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology, as agreed in 3GPP, may serve as a baseline for NR waveform. The scalable OFDM numerology, such as the adaptive sub-carrier spacing, the channel bandwidth, and the Cyclic Prefix (CP), may also be used in some implementations of the present disclosure. Additionally, at least two coding schemes may be considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the Pcell and zero or more secondary cells. Conversely, the SCG is a set of one or more serving cells including the PSCell and zero or more secondary cells.

As also described above, the Primary Cell (Pcell) may be an MCG cell that operates on the primary frequency, in which the UE either performs the initial connection establishment procedure or initiates the connection reestablishment procedure. In the MR-DC mode, the Pcell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a Pcell of the MCG, or a PSCell of the SCG, depending on whether the MAC entity is associated with the MCG or the SCG. Otherwise, the term Special Cell may refer to the Pcell. A Special Cell may support a Physical Uplink Control Channel (PUCCH) transmission and contention-based Random Access (CBRA), and may always be activated. Additionally, for a UE in an RRC_CONNECTED state that is not configured with the CA/DC, may communicate with only one serving cell (Scell) which may be the primary cell. Conversely, for a UE in the RRC_CONNECTED state that is configured with the CA/DC a set of serving cells including the special cell(s) and all of the secondary cells may communicate with the UE.

As described above, a Non-Terrestrial Network (NTN) refers to a network, or segments of a network, that uses a spaceborne vehicle for data transmission, for example, using one or more Low Earth Orbiting (LEO) satellites and one or more Geostationary Earth Orbiting (GEO) satellites. An NTN typically includes one or more of each of a gateway (GW), a g-node B (gNB), a satellite, and a user equipment (UE). FIG. 1 is a diagram illustrating wireless communication in an NTN based on a transparent payload, according to an example implementation of the present disclosure. In FIG. 1, for example, an NTN 100 may include a gNB 102, a satellite (e.g., LEO) 104, and a user equipment (UE) 106. The NTN 100 may include the LEO satellite 104 implementing a transparent payload at an orbit 108 of approximately 600 km from the surface of earth. In some such implementations, a transparent payload may perform Radio Frequency filtering, Frequency conversion, and amplification, thus, waveform signal repeated by the payload is unchanged except for Frequency translation and Transmit Power.

In some implementations, a ground or an earth station may include a Sat-gateway and a Telemetry, Tracking, Command, (TTC) and Monitoring unit. In some such implementations, one or several Sat-gateways may be attached to a Base Station (BS) Base Band Unit (BBU) or a gNB that connects the Non-Terrestrial Network to a Core Network/ Application Server. Node BBUs may be close to Sat-gateways either co-located or at a few kilometers away while antenna diversity may be required depending on geographical location and feeder-link frequency band.

In some implementations, the satellite 104 in FIG. 1 may be a Geostationary Earth Orbiting (GEO) or a Non-GEO. The satellite 104 may be part of a Satellite Constellation to ensure service continuity and may be served successively by one or several Sat-gateways. A Satellite Constellation Controller may provide each base station with satellite system data (ephemeris, satellite position, orbit, velocity, etc.). In some implementations, a feeder link 110, which may be a radio link conveying information for a satellite mobile service between a Sat-gateway 102 and the satellite 104. In some implementations, a service link 112 is a radio link between the LIE 106 and the satellite 104. In some implementations, the satellite typically generates several spot-beams over a given service area bounded by a Field of View (FoV) or Footprint (e.g., of the satellite 104). In some such implementations, the footprints of the spot-beams typically form an elliptic shape (e.g., satellite beam 114 in FIG. 1). In some implementations, the UE 106 may be Global Navigation Satellite System (GNSS) capable to support data communication with a GNSS satellite 116 at a higher orbit 118 of approximately 20200 km from the surface of earth. In some implementations, different types of UE 106 may include handheld devices (e.g., NR and/or LTE smart-phones), internet-of-things (IoT) devices (e.g., NB-IoT and eMTC), VSAT, moving platforms (e.g., aircraft, vessels, and building-mounted devices), etc.

In some implementations, a quasi-earth fixed scenario may refer to a geographic area for a period and a different geographic period for another period. In some implementations, a platform such as a LEO satellite may create quasi-earth-fixed beams if satellite beam steering is supported. In some implementations, handovers may typically occur in bursts for all UEs in each coverage area (e.g., every few minutes) in the quasi-earth-fixed scenario.

In some implementations, an earth-moving scenario may refer to a different geographic area from one instant to the next. The overall coverage area of the beam may keep changing continuously. In some implementations, a platform, such as a LEO satellite, may use earth-moving beams and, thus, cover different geographic areas as the platform keeps orbiting the earth. In some implementations, when an NTN cell uses an earth-moving beam, even stationary UEs may experience a change in the cell frequently (e.g., every few seconds). In some implementations, handovers may typically occur continuously in the earth-moving scenario.

In other implementations, in a feeder link switch scenario, timing information (e.g., common timing information, common drift rate and common drift variant, as for the cell/satellite for the UE to adjust its UL timing advance) regarding when a cell/satellite is about to start or stop serving the area for the earth-fixed scenario may be broadcast to the UE via system information. In some implementations, the feeder link switch may refer to a link change between a satellite and a GW, where the GW may be collocated with a gNB. The duration of the feeder link switch may be predictable based on satellite ephemeris and GW's location. In some implementations, the NW may broadcast the feeder link switch period for the UE to stop or start measurements, transmission, and/or receptions.

NTN is introduced in 3GPP New Radio (NR) network to support communication services via satellites. However, due to certain technical features of satellites, a cell configured for a satellite may be available/accessible to a UE only during a particular time period, due to an orbit of the satellite. The available time period for the cell may be predictable by a UE on earth. Thus, it would be beneficial for the UE to estimate/ understand the available time period assigned to a cell or RAN to avoid unnecessary and/or insignificant measurement/detection of a RAN/cell. Therefore, some high-level agreements are discussed among members of the 3GPP community to achieve the above benefits, such as: at least in the quasi-earth fixed scenario, the timing information regarding when a cell is about to stop serving an area is needed to assist cell reselection in NTN for earth fixed scenario; the timing information regarding when a cell is about to stop serving the area is used to determine when to perform measurement on neighboring cells; and the timing information regarding when a cell is about to stop serving the area for the earth fixed scenario is broadcast to the UE via system information.

However, many pending issues are still awaiting discussions while trying to enhance NR communication systems to support NTN based on the aforementioned high-level agreements. Thus, some of the present implementations provide enhancements to NR protocols to support NTN.

As discussed above, the present disclosure may improve NR protocols to support NTN. The present disclosure relates to a UE and a method of the UE to determine timing information regarding SAP of a service cell implemented by a Non-Terrestrial Network (NTN). In some implementations, a SAP design may be configured to indicate the available service time period of a specific RAT, RAN, or cell, which may be observed by the UE while the RAT, the RAN, or the cell is implemented via one or more NTNs.

Service Available Period (SAP) Indication

In some implementations, a SAP may be configured (e.g., via UE-specific dedicated control signaling, group-based control signaling (e.g., via group PDCCH transmission), or broadcasting system information) to a UE to indicate a stop/pause moment (or the remaining time period) of the service, or to indicate when the service may not be available to the UE. In some implementations, a SAP may be configured to the UE to indicate when the service may not be available to the UE in an associated (e.g., serving/non-serving/target/concerned) cell, RAN, or RAT. In some implementations, a SAP of a service in a neighboring cell, a different RAN, or a different RAT may be configured to the UE. In some other implementations, the SAP may indicate the available time span (or available time period) in which a service may be available to the UE. In some other implementations, the SAP may indicate the available time span (or available time period) in which a service may be available to the UE in a serving cell/RAN/RAT. In some other implementations, the SAP may indicate the available time span (or available time period) in which a service may be available to the UE in a neighboring cell, a different RAN, or a different RAT. In some implementations, the serving NW (e.g., the serving RAN) may provide the timing information about one or more new upcoming cell(s), for example, the time when a new upcoming cell (e.g., alternatively a RAT or a RAN) starts to be become available. In some such implementations, the UE may start measuring at the time (or after the time) provided by the NW or the UE may start measuring beforehand by applying a configurable timing advance (TA).

In some implementations, the service may be a RAN service, a RAT service, or a cell service. In some implementations, the service may include, but is not limited to, a RAN SAP, a cell SAP, or a RAT SAP.

In some implementations, the UE's SAP may include the "stop time" in which the UE may access the service (e.g., via an associated RAN, RAT, or cell).

In some such implementations, after receiving the RAN SAP, the UE may calculate the available time period for a specific RAN from the moment that the UE receives the RAN SAP, which may include the indicated stop time of the associated RAN. In some such implementations, the UE may calculate, estimate, or monitor the available time period (e.g., remaining available time period) of a specific RAN based on the received RAN SAP, which may include the indicated stop time of the associated RAN.

In some implementations, after receiving the cell SAP, the UE may estimate the available time period for a specific cell from the moment that the UE receives the cell SAP, which may include the indicated stop time of the associated cell (e.g., via the physical cell ID).

In some implementations, after receiving the RAT SAP, the UE may estimate the available time period for a specific RAT from the moment that the UE receives the RAT SAP, which may include the indicated stop time of the associated RAT.

In some implementations, the UE's SAP may include a "time period" in which the UE may access the service (e.g., via the RAN, RAT, or cell) or the time period that the UE may expect the target RAT, RAN, or cell service to be available to the UE. On the other hand, the UE may expect that a target RAT, RAN, or cell service is not available to the UE while out of the given RAT, RAN, or cell SAPs, and the UE may accordingly stop uplink transmission service and/or downlink reception service associated with the target RAT, RAN, or cell service. In some implementations, the SAP may configure a time duration denoted by [t1, t2]. The time duration [t1, t2] on the serving and neighboring cells (e.g., or associated NW or RAT) time period may be defined as a time duration [t1, t2] associated with each of serving cells and neighboring cells. In some implementations, the UE may execute measurement, transmission, reporting, and/or reception with the cells during the given time duration (e.g., if the time duration [t1, t2] is configured).

Figure 2:
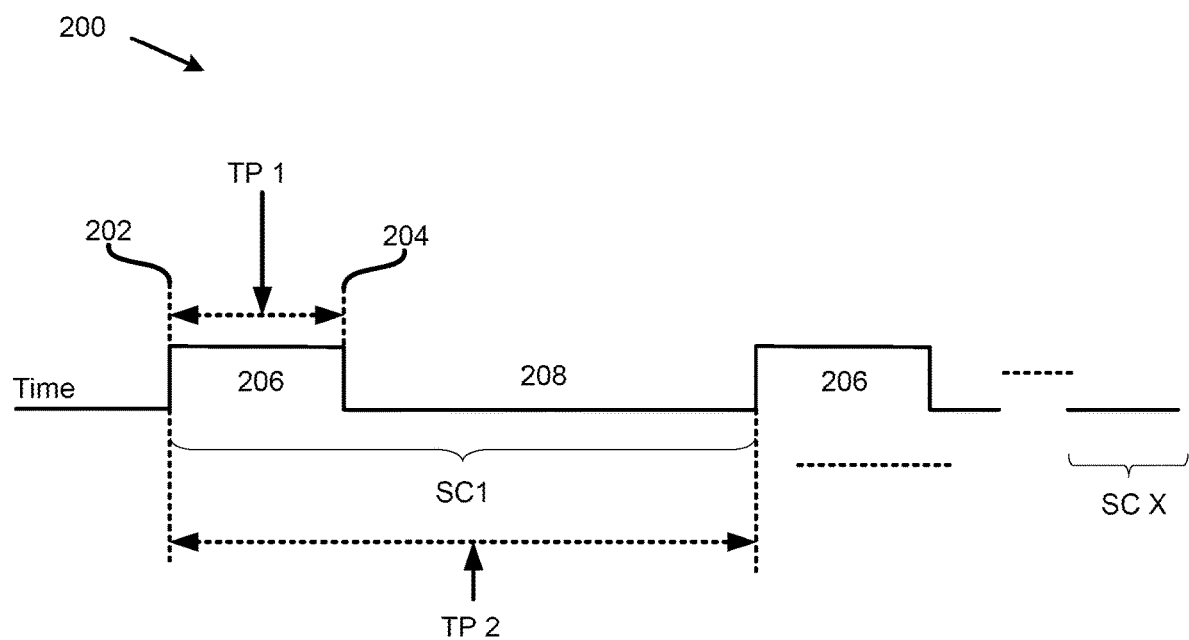
FIG. 2 is a diagram illustrating at least one service cycle and service available period in the time domain, according to an example implementation of the present disclosure.

FIG. 2 is a timing diagram illustrating at least one service cycle and service available period (SAP) in the time domain 200, according to an example implementation of the present disclosure.

In some implementations, the time period indicated above may include a "start time", which may indicate the moment that a service may be available (e.g., to the UE). In some implementations, the start time may be indicated at time 202, as shown in FIG. 2. In some implementations, the start time may also be implemented as an "offset time" based on a timing reference given to the UE, for example, System Frame Number '0' may be received by the UE from the serving RAN such as an NR-RAN or an E-UTRAN). In some such implementations, the timing reference may be a Global Navigation Satellite System (GNSS). In some implementations, the serving cell or the serving RAN may provide the start time by using Coordinated Universal Time (UTC). In some such implementations, to apply the start time provided by the serving RAN/serving cell, the UE may obtain the current UTC time from the corresponding GNSS, the value of which may be expressed in milliseconds.

In some implementations, a time period may include a "stop time", which may indicate the moment that a service may not be available (e.g., to the UE) after the stop time. In some implementations, the stop time may be indicated at time 204, as shown in FIG. 2. In some implementations, the stop time may also be configured as the "time period or time span" of the SAP. In some implementations, a time period denoted as TP1 may be a time period from the start time 202 to the stop time 204, as shown in FIG. 2.

In some implementations, a time period may include a periodicity in which the service may be available (e.g., to the UE). In some such implementations, a periodicity may be the entire time span of a service cycle. In some implementations, a time period TP2 may include a periodicity that span the entire service cycle SC1, as shown in FIG. 2. In some implementations, based on the given service cycle configuration, the UE may expect the SAPs to appear continuously and/or periodically. In some such implementations, a SAP 206 may occur in the beginning of every service cycle (e.g., service cycle SC1). In some implementations, SAPs 206 may occur in the beginning of the service cycle SC 1 and service cycle SC X (RAT, RAN, or cell service cycle), as shown in FIG. 2. In some implementations, the UE may be configured with RAT, RAN, or cell service cycle configuration associated with RAT, RAN, or cell SAP configuration. In some implementations, a service cycle (e.g., RAT, RAN, or cell service cycle) may further include a "Service Unavailable Period" in which the UE may not expect to be served by the cell (or satellite). In some implementations, the service unavailable period 208 may be after the SAP 206 in FIG. 2. In some implementations, the UE may determine to implement an Idle mode while the UE is out of a RAT, RAN, or cell service coverage area in an NTN, for example, during the service unavailable period 208. Please also note that, in some implementations, the (RAT/RAN/cell) SAP may be include (e.g., any combinations of) one or more aperiodic/periodic/segmented radio frame/sub-frame/slot/minimum slot patterns (e.g., as defined in the 3GPP E-UTRA/NR frame structure) or by second/millisecond (ms)/microsecond(us) in the time domain.

In some implementations, the service cycle (or the SAPs) may not continue endlessly for the UE. The UE may be further informed of the remaining number of SAPs (or the remaining number of service cycles) of a specific RAT, RAN, and cell. In some such implementations, with regard to the remaining number of SAP/Service Cycle, the current SAP or service cycle that the UE is experiencing may or may not be counted. In some other implementations, the UE may be informed, configured, or notified a service close time, which may indicate the RAT, RAN, or cell may no longer provide service(s) after the service close time. In other words, any SAP after the service close time may be considered as invalid.

In some implementations, the SAP (e.g., RAN, RAT, or cell SAP) may be a periodic time pattern. In some other implementations, the SAP (e.g., RAN, RAT, or cell SAP) may be a one-shot (i.e., aperiodic) configuration, for example, only one service cycle (e.g., RAN, RAT, or cell cycle) may be observed by the UE.

In some implementations, the SAP may be presented in units of symbol, slot, subframe, radio frame, second or microsecond depending on the frame structure of the serving cell or the serving RAN, for example, the frame structure of E-UTRA or New Radio protocols.

In some implementations, the UE may try to monitor, detect, or receive the down link (DL) reference signaling (e.g., New Radio Synchronization Signal Block (SSB) Sets or Channel State Information Reference Signal (CSI-RS)) of the target RAT, RAN, or cell only during the associated RAT, RAN, or cell SAPs received by the UE. In some additional implementations, the UE may start the target RAT, RAN, or cell detection with a timing-offset prior to the given starting point of the target RAT, RAN, or cell SAPs. The timing-offset may be pre-defined in the technical specification or be configured by the serving RAN via broadcasting system information and/or UE-specific DL control signaling.

In some implementations, the UE may not try to monitor, detect, or receive the DL reference signaling (e.g., New Radio Synchronization Signal Block (SSB) Sets or Channel State Information Reference Signal (CSI-RS)) of the target RAT, RAN, the cell while out of the associated RAT, RAN, or cell SAPs received by the UE. In some implementations, the UE may start monitoring, detecting, or receiving the DL reference signaling (e.g., SSB Sets or CSI-RS) of different RAT, different RAN, or neighboring cell while in the associated RAT, RAN, or the cell SAPs.

In some implementations, if a time duration [t1, t2] for a cell, RAT, or RAN is provided by the NW, the UE may start UL transmission (e.g., PRACH, PUSCH, PUCCH, SRS transmission during the time duration [t1, t2]). In some implementations, the UE may start before the time duration by a (uplink) timing advance if provided by the NW.

In some implementations, if the time duration [t1, t2] for a RAT, RAN, or cell SAP is configured by the serving RAN, the UE may start UL transmission, such as, PRACH (e.g., SAP during the SAP of a special cell), PUSCH (e.g., during the SAP of a special cell or secondary cell), PUCCH (e.g., during the SAP of a special cell or a PUCCH cell), or SRS transmission (e.g., during the SAP of a serving cell) during the time duration [t1, t2]. In some additional implementations, the UE may start UL transmission service before the time duration by a timing advance, which may be estimated by the UE, if provided by the serving RAN.

In some implementations, the UE may stop the UL transmission service associated with a serving cell (e.g., PRACH, PUCCH, PUSCH, or SRS transmission) while the UE is not staying in the SAP of a serving cell. In some additional implementations, the UE may decide the stop/pause moment based on the SAP configuration with a timing advance value in advance.

RAT Service Available Period (SAP)

In some implementations, a RAT SAP may be defined as the time period in which a UE may access a radio access technology (e.g., E-UTRA, New Radio).

In some implementations, the RAT SAP may be associated with one or more frequency carrier indication (e.g., E-UTRA-ARFCN, NR-ARFCN).

In some implementations, the UE may or may not try to detect, monitor, or access a RAT (e.g., on the associated frequency carrier) while out of the given RAT SAP.

In some implementations, the UE may or may try to detect, monitor, or access a RAT (e.g., on the associated frequency carrier) only during the given RAT SAP. In some implementations, the UE may start monitoring, detecting, or receiving different RAT while in the associated RAT SAP.

In some implementations, the UE may give a frequency carrier, which may be associated with a longer RAT SAP to the UE, a higher priority during a cell selection or reselection procedure, for example, in comparison with the frequency carrier which may be associated with a shorter RAT SAP. In some additional implementations, regarding a high priority frequency carrier (e.g., with longer RAT SAP), the UE may add an additional offset value (e.g., a positive value) while the UE is evaluating the cell(s) operating on the high priority frequency carrier, for example, while the UE is implementing cell selection criterion S to the cells operating on the high priority frequency carrier as disclosed in the 3GPP TS 38.304. In some implementations, the value of offset may be pre-defined in technical specification or may be configured by the serving RAN via broadcasting system information or UE-specific DL control signaling (e.g., RRC signaling, such as RRCReconfiguration message).

RAN Service Available Period (SAP)

In some implementations, a RAN SAP may be defined as the time period in which a UE may access the Radio Access Network (e.g., E-UTRA or NR-RAN/NR-AN).

In some implementations, the RAN SAP may be associated with one or more network identity (e.g., PLMN ID, SNPN ID, CSG ID). In some implementations, the RAN SAP may also be considered as a NW SAP to a specific (e.g., telecom/NTN/satellite) service provider.

In some implementations, the UE may not or may try to detect, monitor, or access a RAN (e.g., associated with a PLMN ID, SNPN ID, CSG ID) while out of the given RAN SAP.

In some implementations, the UE may or may try to detect, monitor, or access a RAN (e.g., associated with a PLMN ID, SNPN ID, CSG ID) only during the given RAN SAP. In some implementations, the UE may start to monitor, detect, or receive different RAN(s) while in the associated RAT SAP(s).

Cell Service Available Period (SAP)

In some implementations, a cell SAP may be defined as the time period in which a UE may access a cell, which may be presented by or associated with a physical cell ID (e.g., PCI) or cell identity.

In some implementations, a cell SAP may be associated with a target PCI. In some other implementations, a cell SAP may be associated with more than a target PCI, for example, a cell SAP may be associated with the cells serving by the same BS, satellite, or gateway.

In some implementations, the UE may obtain ephemeris information from a serving cell via system information (e.g., SIB1) broadcasted by the serving cell. In some additional implementations, the UE may obtain the ephemeris information of neighboring cells via system information (e.g., SIB2, SIB3, SIB4, or SIB5 in NR protocols). In some implementations, one or more cells may share the same ephemeris such that the serving cell may also broadcast the cell identity list (e.g., PCI list or Cell identity list) that share the same ephemeris information. In some additional implementations, the cells that share the same ephemeris information may also share the same SAP configuration. In other words, the serving RAN may only need to configure the ephemeris information of a cell (e.g., a serving cell) and the cell list that shares the same ephemeris information. In some such implementations, based on the above configuration, the UE may implicitly recognize that such cells also share the same SAP configuration. In some such implementations, the serving RAN may or may transmit the SAP configuration of one of the cells via explicit configuration such that the UE may recognize such cells share the same SAP configuration. In some implementations, due to the technical features of NTN, there may be more than one cell associate with a satellite ID, or a configuration of ephemeris information of a satellite provided by the serving RAN.

In some implementations, the cell SAPs of different cells may not overlap with each other (e.g., from the point of view of the UE). In some implementations, the cell SAPs of different cells may overlap or partially overlap with each other (e.g., from the point of view of the UE).

In some implementations, the UE may not or may not try to detect, monitor, or access a cell (e.g., associated with a PCI or cell identity) while out of the given cell SAP.

In some implementations, the UE may or try to detect, monitor, or access a RAN (e.g., associated with a PCI or cell identity) only during the given RAN SAP.

In some other implementations, the UE may consider the sequence of cells for measurement, detection, or access by jointly considering the overlapped SAPs of these Cells. In some implementations, the UE may determine the sequence by following the sequence of a cell ID list (e.g., the cell sequence appeared in the PCI list or cell identity list associated with one PLMN/SNPN/CSG) and the SAP overlapping conditions.

In some implementations, the UE may give a cell, which may be associated with a longer cell SAP to the UE, a higher priority during a cell selection or reselection procedure.

In some other implementations, implementation(s) or decision(s) of the UE may determine the sequence of cells for measurement or detection while the SAPs of the cells overlap. In some implementations, the overlapping condition and the sequence design may also be applicable to RAT SAPs or RAN SAPs.

In some implementations, the UE may give a cell, which may be associated with a longer cell SAP to the UE, a higher priority during a cell selection or reselection procedure, for example, relative to a cell which may be associated with a shorter cell SAP. In some additional implementations, to such high priority cell (e.g., with longer Cell SAP), the UE may add an additional offset value (e.g., a positive value) while the UE is evaluating the concerned cell, for example, while the UE is implementing cell selection criterion S to the concerned cell, as shown in the 3GPP TS 38.304. In some implementations, the value of the offset may be pre-defined in technical specification or may be configured by the serving RAN, for example, via broadcasting system information or UE-specific DL control signaling (e.g., RRC signaling, such as RRCReconfiguration message). Conversely, in some implementations, for a low priority cell (e.g., that has a short Cell SAP), the UE may add an additional offset value (e.g., a negative value) when the UE is evaluating the concerned cell.

For a quasi-earth fixed cell, the information regarding when a cell is about to stop serving the area may be broadcasted to the UE via system information and the UE may apply such timing information to determine when to perform measurement on neighboring cells.

In some implementations, a cell SAP may be associated with a set of cells. In the broadcasting system information, the serving cell may configure a cell SAP with a cell identity list (e.g., a PCI list or cell identity list) to inform the UE that all of the cells in the cell identity list may share the same Cell SAP. In some implementations, the cell group may be specifically configured by the serving cell. In some other implementations, the cell group may be a Timing Advance (TA) Group, a Master Cell Group (MCG) or a Secondary Cell group (SCG), for example, configured for Dual connectivity, or the secondary cells configured to the UE, for example, configured for Carrier Aggregation. In some implementations, the Dual Connectivity configuration may include New Radio Dual Connectivity (NR-DC), E-UTRA-NR Dual Connectivity (EN-DC), NGC-E-UTRA-New Radio Dual Connectivity (NGEN-DC), New Radio-E-UTRA Dual Connectivity (NE-DC), and/or Multi-RAT Dual Connectivity (MR-DC).

In some implementations, the UE may implicitly or directly determine or refer the cell SAP of a cell (e.g., Cell #1, which the UE may not receive any explicit indication about the SAP of Cell #1) by referring to the (e.g., cell) SAP of another cell (e.g., Cell #2, which the UE may have received one or more clear indication about the SAP) while both cells (e.g., Cell #1 and Cell #2) share the same ephemeris configuration, or both cells are associated with the same gNB determination.

In some implementations, a cell SAP may influence Carrier Aggregation (CA). In some implementations, while the UE is configured with CA (e.g., the UE is configured with a Primary Cell (Pcell) and at least one Secondary Cell (Scell)), the UE may be explicitly informed of the (e.g. cell) SAP of the Pcell. In some such implementations, the UE may implicitly apply the cell SAP of the Pcell to all of the Scells that are configured to the UE, for example, regardless of whether any one of the Scells is activated or de-activated in the UE side. It should be noted that, in some implementations, the UE may be configured with all TN cells (or all NTN cells) in one cell group (e.g., in one MCG/SCG). In some other implementations, the UE may be configured with any combination of TN cells/NTN cells within one cell group.

In some implementations, the cell SAP may influence the Secondary Cell Group (SCG). In some implementations, while the UE is configured with Dual Connectivity with an SCG configuration, for example, the UE is configured with a Primary Secondary cell (PSCell) and at least one Scell associated with the SCG, the UE may be explicitly informed of the (e.g., cell) SAP of the PSCell. In some such implementations, the UE may implicitly apply the cell SAP of the PSCell to all of the Scells in the same SCG, for example, regardless of whether any one of the Scells is activated or de-activated in the UE side.

In some implementations, the cell SAP may influence the Master Cell Group (MCG). In some implementations, while the UE is configured with Dual Connectivity with an MCG configuration, for example, the UE is configured with a Pcell and at least one Scell associated with the MCG, the UE may be explicitly informed of the (e.g., cell) SAP of the Pcell. In some such implementations, the UE may implicitly apply the cell SAP of the Pcell to all of the Scells in the same MCG, for example, regardless of whether any one of the Scells is activated or de-activated in the UE side. In some implementations where Dual Connectivity is configured, the SAP configuration for MCG and SCG may be configured independently. In some additional implementations, only one cell group may be configured with SAP (e.g., the cell group may be implemented over an NTN) and another cell group may not be configured with SAP (e.g., the cell group may be implemented over a Terrestrial Network or a TN).

In some implementations, the cell SAP may influence Dual Connectivity. In some implementations, while the UE is configured with Dual Connectivity with an MCG configuration and an SCG configuration, the UE may be explicitly informed of the (e.g., cell) SAP of the Pcell. In some such implementations, the UE may implicitly apply the cell SAP of the Pcell to all of the Scells in the MCG and SCG, for example, regardless of whether any one of the Scells or PSCell is activated or de-activated in the UE side. In some implementations where Dual Connectivity is configured, the SAP configuration for MCG and SCG may be shared.

In some implementations, the RAN, RAT, or cell SAP may influence the UE's RRC states while the RAT, RAN, or cell SAP is associated with the serving RAT, serving RAN, or serving cell of the UE.

In some implementations, the UE may stay in a RRC CONNECTED state while the UE stays in the RAT, RAN, or cell SAP of the serving RAT, serving RAN or Serving cell. In some implementations, the UE may determine to implement an Idle mode while the UE is out of the RAT, RAN, or cell coverage area (e.g., SAP) in the NW (e.g., an NTN). In some such implementations, the UE may transition to an Idle mode (e.g., an RRC Inactive state or RRC Idle state) while or after the UE moves to a service unavailable Period (e.g., out of overage area) of the concerned serving RAT, serving RAN, or serving cell. In other implementations, while the UE moves to the Service Unavailable Period (e.g., out of coverage area) of the concerned or current serving RAT, serving RAN, or serving cell, the UE may transition to an Idle mode (e.g., an RRC Inactive state or RRC Idle state) if a NW command is not received when a timer expires. In some such implementations, the timer may start at the starting time of the Service Unavailable Period (e.g., out of coverage area) of the concerned or current serving RAT, serving RAN, or serving cell.

In some implementations, the UE may move to the Idle mode based on the instructions from the serving cell, for example, the UE may receive an RRCRelease message with or without a suspend configuration and then may move to an RRC Inactive state or an Idle state, respectively, before the UE turns to the (e.g., RAT, RAN, or cell) Service Unavailable Period. In some implementations, while the UE moves to a SAP, the UE may request to establish (e.g., via RRC Setup Request message delivery) a new RRC connection or resume (e.g., via RRC Resume Request message delivery) the established RRC connection with the serving cell or serving RAN again.

In some implementations, the timing that the UE determined to be the start of a SAP (or one Service Unavailable Period) may be jointly considered with a (e.g., UL) timing advance (TA). In some implementations, the serving RAN may broadcast at least one common TA, which may be common for a large amount of UEs served by the serving RAN within a specific geographical area. In some such implementations, the UE may also derive a UE-specific TA value based on some supporting information provided by the serving RAN. As such, the UE may determine a corresponding SAP based on the SAP configurations received from the serving RAN with the TA value, for example, the UE may apply the SAP (or the Service Unavailable Period or the Service Cycle) earlier than the given SAP configuration with the above UL TA value.

In some implementations, the UE may stay in an RRC Connected state during the (e.g., RAT, RAN, or cell) Service Unavailable Period. In other words, the Service Unavailable Period may be considered as a kind of C-DiscontinuousReception (C-DRX) mechanism to the UE. In some such implementations, the UE may move to DRX off-periods while the UE move to the Service Unavailable Period and the UE may move to a DRX On-duration during the SAP. In addition, the UE may be pre-configured with C-DRX parameters to cover the Service Unavailable Periods.

In some implementations, an RRC state transition may be conditional. In some implementations, the UE may (e.g., automatically) move to an RRC Inactive state while the UE moves to the Service Unavailable Period. In some other implementations, the serving cell of the UE may pre-configure the UE Inactive Context, which may be the UE context that the UE may keep after moving to the Service Unavailable Period. As such, the UE may move to an RRC Inactive directly while the UE moves to the (e.g., RAT, RAN, or cell) Service Unavailable Periods (e.g., while the UE moves out of a $1^{st}$ SAP). In some implementations, the pre-configuration may be transmitted via an RRCRelease message (e.g., or an RRCReconfiguration message) to the UE. In some implementations, the UE may not transition to an RRC Inactive state right after receiving the RRC message from the serving cell.

In some implementations, the UE may consider a "conditional RRC state transition." In some such implementations, the UE may move to an RRC Inactive state (e.g., only) while or after the UE moves to the Service Unavailable Period. In some additional implementations, the UE may move to another (RAT, RAN, or cell) SAP (e.g., $2^{nd}$ SAP) immediately after the Service Unavailable Period. In some such implementations, the UE may initiate a Random Access Procedure to transmit an RRCResumeRequest message to the serving cell, for example, within the MSG3 delivery during a 4-step RA procedure or within the MSGA delivery during a 2-step RA procedure, after the UE moves to another SAP (e.g., the $2^{nd}$ SAP) to request resuming a corresponding RRC Connection with the serving RAN.

In some other implementations, the UE may stay in an RRC Connected state during two SAPs (e.g., the $1^{st}$ SAP and the $2^{nd}$ SAP). In some such implementations, the UE may be prohibited to start a DL and/or UL service (and/or SL service) if the UE is not staying in any given SAP. In some implementations, the UE may need to transmit an RRC reestablishment request message when the UE moves to another SAP (e.g., the $2^{nd}$ SAP) to reestablish the RRC connection with the serving RAN. It should be noted that, in some implementations, the UE may apply (NR/LTE-V2X) SL communication services based on a sidelink preconfiguration (e.g., which is preinstalled at the UE) when the UE is not staying in any given SAP. In other words, in some such implementations, the UE itself may consider that it is staying in an out-of-coverage area when the UE is not staying in any given SAP.

In some implementations, the UE may move to RRC Idle state while the UE moves from the $1^{st}$ SAP to the Service Unavailable Period (e.g., out of coverage area of a RAT, RAN, or cell service). In some implementations, the UE may move to an RRC Idle state while the UE moves from the $1^{st}$ SAP of an NTN to the Service Unavailable Period. Then, after the Service Unavailable Period, the UE may initiate a random access procedure to transmit an RRCSetupRequest message, for example, within the MSG3 delivery during a 4-step RA procedure or within the MSGA delivery during a 2-step RA procedure, to connect the RRC connection with the serving RAN again.

In some implementations, the UE may be configured with an initial value of a RAN Notification Area Update (RNAU) Timer (e.g., T380 in New Radio Protocols) in the RRCRelease message, which may instruct the LIE to move to an RRC Inactive state. In some such implementations, the UE may start the RNAU timer (e.g., and may also count the RNAU timer to zero) from the given initial value when the UE moves to the RRC Inactive state based on the instruction from the serving RAN (e.g., via the RRCRelease message). In some such implementations, while the timer T380 is counted to zero by the UE, the UE may initiate a RNAU procedure with the corresponding serving cell (e.g., via a RRCResume Request message transmission with a resume case RNAU) to update the corresponding location with the serving RAN.

In some implementations, the UE may move to coverage holes (or Service Unavailable Period) of the serving RAN in which the UE may not find any available serving cell (and serving base station) that is associated with the serving RAN during a service unavailable time period (e.g., out of coverage area). In some such implementations, the UE may also observe, monitor, or predict the service unavailable periods based on the (e.g., RAT, RAN, or cell) SAP configurations, which the UE may receive from the serving RAN. In some implementations, the UE may stop monitoring the available base station or RAN during the Service Unavailable Period, for example, as such, the UE may not initiate RNAU procedure even the UE has counted the timer T380 to zero. In some other implementations, after the timer T380 is counted to zero, the UE may initiate a RNAU procedure after the UE moves to the SAP of the serving RAN again.

In some implementations, the UE may stop or freeze the counting time T380 during the service unavailable periods observed by the UE. In some such implementations, the UE may resume the frozen timer T380 and count the resumed timer T380 to zero while the UE moves to the SAP of the serving RAN (e.g., serving RAT, or serving cell) again. In some other additional implementations, the UE may not stop or freeze the counting timer T380 during the service unavailable periods such that the timer T380 may also be counted during the service unavailable periods of the serving RAN. In addition, the UE may not initiate an RNAU procedure (or re-start the T380 counting procedure) while the T380 expires during the service unavailable periods of the serving RAN. Instead, the UE may initiate an RNAU procedure (or re-start the T380 counting procedure) after the UE moves back to the service available periods of the serving RAN if the running T380 expires during the service unavailable period.

In some implementations, the SAP may be configured to be associated with SMTC configuration(s) (e.g., intra-frequency SMTC configuration or inter-frequency SMTC configuration, but are not limited to the examples disclosed herein). In some implementations, the SAP may be configured to be associated with Measurement configuration(s). In some implementations, the SAP may be configured to be associated with Measurement Object configuration(s). In some implementations, the SAP may be configured to be associated with Report configuration(s). In some implementations, the SAP may be configured to be associated with Measurement gap configuration(s) (e.g., UE-based Measurement gap configuration, FR1-based Measurement gap configuration, or FR2-based Measurement gap). In some implementations, the SAP may be configured to be associated with one or more target cell(s), which may be configured for a conditional handover (or for a conditional reconfiguration) configuration, Dual Active Protocols Stack (DAPS) handover configuration, handover procedure, or (conditional) Special Pcell change (SpCell) change configuration.

In some implementations, the RAT, RAN, or cell SAPs may be transmitted via broadcasting system information. The RAT, RAN, or cell SAP broadcasting mechanisms may be further described below.

In some implementations, the RAT, RAN, or cell SAP may be associated with UE-specific control signaling or be associated with Information Element(s) within the UE-specific control signaling.

In some implementations, the RAT, RAN, or cell service may include at least one of a DL (e.g., normal) service, a UL (e.g., normal) service, and an emergency service.

In some implementations, the RAT, RAN, or cell SAP may be further associated with a combination of service types above. In some implementations, the RAT, RAN, or cell SAP may be associated with a default service type (e.g., a DL (normal) service and a UL (normal) service). In some implementations, the different SAPs associated with different service types may be overlapped in the time domain. In some such implementations, while the UE needs to initiate a service (e.g., being requested or instructed by the NAS layer), the UE may refer to the specific SAP of the initiated service to check when the UE may initiate the service with the serving RAN.

In some implementations, the (e.g., cell) SAP may be configured to be associated with RACH-less handover (HO). In some implementations, the RACH-less HO may indicate skipping Msg1 and Msg2 of the random-access procedure when the UE accesses the target cell, and instead the first transmission may be the message confirming the completion of the HO. The SAP information may help UE to determine the HO timing, for example, when the UE has a TA value equal to zero or a very small TA difference between the source and target cell.

In some implementations, the UE may stop using a NR sidelink resource configuration (e.g., via SIB12 or NR sidelink configuration from UE-specific control signaling, such as sl-ConfigDedicatedNR) and/or E-UTRA V2X sidelink communication resource configuration (e.g., via SIB13/SIB14 or E-UTRA V2X sidelink communication configuration from UE-specific control signaling, such as sl-ConfigDedicatedE-UTRA) that is associated with a serving cell while the UE is not staying in the SAP of the serving cell. In some such implementations, the UE may use the sidelink pre-configuration (of NR sidelink service or E-UTRA V2X sidelink communication service) if the sidelink configuration from the serving cell is not accessible during the Service Unavailable Period(s). In other words, the NR sidelink resource configuration and/or the E-UTRA V2X sidelink communication resource configuration may be applicable only during the SAP of the Serving Cell. In some implementations, the configuration above may be applicable to the cells on both serving frequency carrier and non-serving frequency carrier while cell selection or reselection is implemented.

In some implementations, the UE may not obtain the RAT SAP configuration or RAN SAP configuration directly. Instead, the UE may determine the SAP that is associated with a specific RAN or a specific RAT based on the cell SAP configurations associated with the concerned RAN or concerned RAT is observed by the UE. The UE may receive the information about the RAT(s) or RAN(s) that is supported by each cell based on the broadcasting system information received by the UE.

Broadcasting System Information

In some implementations, the RAT/RAN/Cell SAPs may be delivered via the broadcasting system information or being derived by the UE via the satellite information provided by the broadcasting system information (e.g., SIB1/SIB19). In some additional implementations, the UE may obtain the satellite information via UE-specific control signaling or via performing an SI on-demand procedure.

In some implementations, the UE may camp on or connect to a serving cell and the UE may obtain and/or store broadcasting system information (e.g., SIB1 or other System Information (SI)) from the serving cell.

In some implementations, the serving cell may be the primary cell (Pcell) or the primary secondary cell (PSCell) of the UE or a secondary cell (Scell) of a cell group (e.g., MCG or SCG).

In some implementations, the UE may be in an (NR/E-UTRA) RRC Connected state, an RRC Inactive state or an RRC Idle state.

In some implementations, the serving cell may be a NR Cell or an E-UTRA Cell.

The mechanism that allows the RAT, RAN, or cell SAPs delivery via the broadcasting system information as described above may be applicable to UEs in an RRC Connected state, an RRC Inactive state, or an RRC Idle state.

In some implementations, the cell (e.g., Cell #1) may broadcast a corresponding cell SAP(s) in an SIB1. In some additional implementations, the cell may transmit the cell SAP(s) in the information element such as cellSelectionInfo or cellAccessRelatedInfo.

In some such implementations, the UE may consider or expect that the serving cell be available only during the given cell SAP(s). In some implementations, the UE may stop performing cell selection or reselection (and/or intra-frequency/inter-frequency/inter-RAT measurement) procedure while the UE is within the Service Unavailable Periods of the cell (e.g., out of cell coverage area of Cell #1). In some implementations, the UE may start or restart cell selection or reselection procedure to reselect to another cell while the UE is leaving or is about to leave the cell SAP of the cell (e.g., Cell #1). In other words, cell selection or reselection procedure (and/or intra-frequency/inter-frequency/inter-RAT measurement) may be triggered while the UE is moving to the Service Unavailable Periods of the cell (e.g., out of cell coverage area of Cell #1) or while the UE is about to move to the Service Unavailable Periods of the cell (e.g., out of cell coverage area of Cell #1).

In some implementations, regarding the serving cell (e.g., Cell #1), the UE may suspend, keep, or retain all or part of the measurement results (and/or all or part of the measurement/report configurations) associated with the cell (e.g., Cell #1) regardless of whether or not the UE is staying in the RAT, RAN, or cell SAPs associated with the cell (e.g., Cell #1). In other words, the UE may keep all or part of the measurement results about the cell (e.g., Cell #1) while the UE is not staying in the SAP of the cell (e.g., Cell #1). In some additional implementations, the UE may reuse or reapply all or part of the suspended, kept, or retained measurement results of the cell (e.g., Cell #1) if the UE moves back to the RAT, RAN, or cell SAP(s) that is associated with the cell (e.g., Cell #1).

In some implementations, the UE may be configured with one idle/inactive measurement configuration for the UE to implement measurement during RRC Inactive/Idle state. Then, after receiving the idle/inactive measurement configuration with measIdleDuration, the UE may start to count one timer T331 to zero by setting the initial value of T331=measIdleDuration. UE would implement idle/inactive measurement based on the idle/inactive measurement configuration while T331 is counting. The UE may then stop idle/inactive measurement (and then the UE may drop/release the stored idle/inactive measurement configuration) while T331 expires. In some additional implementations, the UE may be allowed to drop/release the stored log measurement results after T331 expires. As such, to prevent the UE from releasing the stored idle/inactive measurement configuration (and the idle/inactive measurement results) during the service unavailable period of serving RAN/RAT/Cell, in some implementations, the UE may stop counting T331 during the (RAT/RAN/Cell) Service Unavailable Periods and keep the idle/inactive measurement configuration (with the stored idle/inactive measurement results).

Additionally, in some implementations, the UE may recount the stopped T331 to zero during the next (RAT/RAN/Cell) Service Available Periods. So, in some implementations, the UE may stop implementing idle/inactive measurement (based on the stored idle/inactive measurement configuration) during the (RAT/RAN/Cell) Service Unavailable Periods. The UE may then resume idle/inactive measurement (and so the T331 counting procedure) while the UE moves back to the (RAT/RAN/Cell) Available Periods again. It should also be noted that, in some implementations, the UE may stop running T331 and release the stored idle/inactive measurement configuration while the UE moves to the proposed (RAT/RAN/Cell) Service Un-available Periods. In this condition (i.e., T331 expiry), the stored idle/inactive measurement results may or may not be released/dropped with the release of stored idle/inactive measurement configuration. It should also be noted that, in some implementations, the UE may keep counting T331 during the (RAT/RAN/Cell) Service Unavailable Periods and then the UE may release the stored idle/inactive measurement configuration after the T331 expires. In this condition (i.e., T331 expiry during Service Unavailable Periods), the stored idle/inactive measurement results may or may not be released/dropped with the release of stored idle/inactive measurement configuration.

In some implementations, regarding the serving cell (e.g., Cell #1), the UE may release, delete, or remove all or part of the measurement results (and/or all or part of the measurement/report configurations) associated with the cell (e.g., Cell #1) while the UE is not staying in the RAT, RAN, or cell SAP(s) that is associated with the cell (e.g., Cell #1). In other words, the UE may release, delete, or remove all or part of the measurement results (and/or all or part of the measurement/report configurations) about the cell (e.g., Cell #1) after the UE moves out of the SAP(s) of the cell (e.g., Cell #1).

In some implementations, regarding the serving cell (e.g., Cell #1), the UE may suspend, keep, or retain all or part of the measurements (e.g., based on the received measurement configuration(s)) while the UE is within the RAT, RAN, or cell SAP(s) that is associated with the cell (e.g., Cell #1). The UE may perform all or part of the measurements/reports (e.g., based on the received measurement/report configuration(s)) while the UE is not within the RAT, RAN, or cell SAP(s) that is associated with the cell (e.g., Cell #1).

In some implementations, the cell may be configured to support one or more than one network, where each network may be represented or identified by a Network Identity (e.g., a PLMN ID, SNPN ID, PNI-NPN ID, etc.) broadcasted via SIB1.

In some implementations, a NW indicated in the SIB1 may be further associated with a RAN SAP. In some such implementations, after receiving the RAN SAP, the UE may be informed of the SAPs of a selected or registered NW. In some implementations, the UE may forward the received RAN SAP to the upper layers of the UE side (e.g., the Non-Access Stratum layer). In some such implementations, the upper layers in the UE side may determine whether to select or reselect the operation NW based on the given RAN SAP(s).

In some implementations, the given (e.g., cell) SAP may be associated with a UL (e.g., normal) service such that the UE may still be able to initiate Emergency Service to the cell while the UE is not staying in the cell SAP of the cell (e.g., Cell #1). In some other implementations, the UE may not be allowed to initiate a normal uplink service with the cell (e.g., Cell #1). In some such implementations, the UE may still be able to receive the DL SSB sets & system information broadcasted by the cell (e.g., Cell #1) such that the UE may be able to initiate Emergency Service with the cell (e.g., Cell #1) even while the UE is out of the (e.g., cell) SAP of the cell (e.g., Cell #1).

In some implementations, the UE may identify whether the cell (e.g., Cell #1) support emergency service by reading SIB1 (e.g., by checking whether ims-EmergencySupport or eCallOverIMS-Support is delivered via SIB1).

In some implementations, the serving cell (e.g., Cell #1) may configure a corresponding cell SAP in the SIB2.

In some implementations, the cell (e.g., Cell #1) may configure the RAT, RAN, or cell SAP of a corresponding operation frequency carrier in the SIB2. In some such implementations, the UE may determine whether to implement intra-frequency measurement/report based on the given RAT, RAN, or cell SAP that is associated with the NR frequency carrier, for example, UE may implement intra-frequency measurement/report only while the UE is staying in the RAT, RAN, or cell SAP(s). In some other implementations, the UE may not implement intra-frequency measurement/report if the UE is not staying in the given RAT, RAN, or cell SAPs.

In some implementations, the cell (e.g., Cell #1) may configure one or more information element(s) in the SIB2 to be associated with at least one information element, for example, the following information elements, such as, "intraFreqCellReselectionInfo" and/or the IEs in the "intraFreqCellReselectionInfo" (e.g., "smtc" or "ssb"), may be further associated with one or more RAT, RAN, or cell SAP(s). In some such implementations, the UE may determine whether or not to access the configured information elements based on the given RAT, RAN, or cell SAP that is associated with the NR frequency carrier, for example, the UE may access the configured IE(s) only while the UE is staying in the RAT, RAN, or cell SAP(s) that is associated with the IE. In some other implementations, the UE may not access the configured IE if the UE is not staying in the given RAT, RAN, or cell SAPs.

In some implementations, the UE may release or suspend the "intraFreqCellReselectionInfo" configuration if the UE is moving out of the RAT, RAN, or cell SAPs that are associated with the "intraFreqCellReselectionInfo".

In some implementations, the UE may release or suspend the information elements in the SIB2 (e.g., "smtc" or "ssb" in the "intraFreqCellReselectionInfo" configuration) if the UE is moving out of the RAT, RAN, or cell SAPs that are associated with the concerned information elements.

In some implementations, the UE may suspend, keep, or retain all or part of the intra-frequency measurement results/reports (e.g., the measurement results/reports that the UE obtains based on the "intraFreqCellReselectionInfo") regardless of whether the UE will or will not stay in the RAT, RAN, or cell SAP(s) that is associated with the "intraFreqCellReselectionInfo". In other words, the intra-frequency measurement results/reports may be retained, maintained, or kept even if the UE is moving out of the SAPs that are associated with the intra-frequency measurement/report configuration in SIB2. In some additional implementations, the UE may reuse or reapply all or part of the suspended, kept, or retained intra-frequency measurement results/reports if the UE moves back to the RAT, RAN, or cell SAP(s) that is associated with the "intraFreqCellReselectionInfo" configuration.

In some implementations, the UE may release all or part of the intra-frequency measurement results/reports (e.g., the measurement results/reports that the UE obtains based on the "intraFreqCellReselectionInfo") after the UE moves out of the RAT, RAN, or cell SAP(s) that is associated with the "intraFreqCellReselectionInfo". In other words, the intra-frequency measurement results/reports may be maintained only while the UE stays in the SAPs that are associated with the intra-frequency measurement configuration in SIB2. In some additional implementations, the UE may need to re-obtain or update the "intraFreqCellReselectionInfo" (e.g., the SIB2) every time while the UE moves to the SAP(s) of SIB2 again. In some implementations, the mechanisms above may also be applicable to an IE while the IE is further associated with one or more RAT, RAN, or cell SAP(s).

In some implementations, the information elements contained in the SIB2 may include the information elements common for intra-frequency or inter-frequency and/or inter-RAT cell selection or reselection procedure and intra-frequency, inter-frequency, or inter-RAT measurements. The mechanisms above are not only limited to the intra-frequency cell (re-)selection or measurement but may also be applicable to the inter-frequency cell (re-)selection or measurement, and may not be limited by inter-RAT cell selection or reselection or measurement in SIB2 and other SIB, for example, SIB1/SIB3/SIB4 or other system information blocks may be broadcasted by the serving cell.

In some implementations, the serving cell (e.g., Cell #1) may broadcast an information element contained in SIB3 or SIB3 that may be further associated with the proposed more RAT, RAN, or cell SAP(s).

In 3GPP, SIB3 contains neighboring cell related information relevant only for intra-frequency cell re-selection and the IE includes cells with specific re-selection parameters as well as blacklisted cells. In some implementations, an example of the SIB3 is provided based on 3GPP TS 38.331, as shown in Table 1 below.

TABLE 1

```
SIB3 ::= SEQUENCE {
intraFreqNeighCellList IntraFreqNeighCellList OPTIONAL, -- Need R
intraFreqBlackCellList IntraFreqBlackCellList OPTIONAL, -- Need R
lateNonCriticalExtension OCTET STRING OPTIONAL,
...,
[[
intraFreqNeighCellList-v1610 IntraFreqNeighCellList-v1610 OPTIONAL, -- Need R
intraFreqWhiteCellList-r16   IntraFreqWhiteCellList-r16  OPTIONAL,  --  Cond
SharedSpectrum2
intraFreqCAG-CellList-r16 SEQUENCE (SIZE (1...maxPLMN)) OF IntraFreqCAG-
CellListPerPLMN-r16 OPTIONAL -- Need R
]]
}
IntraFreqNeighCellList ::= SEQUENCE (SIZE (1..maxCellIntra)) OF IntraFreqNeighCellInfo
IntraFreqNeighCellList-v1610::=  SEQUENCE  (SIZE  (1..maxCellIntra))  OF
IntraFreqNeighCellInfo-v1610
IntraFreqNeighCellInfo ::= SEQUENCE {
physCellId PhysCellId,
q-OffsetCell Q-OffsetRange,
q-RxLevMinOffsetCell INTEGER (1...8) OPTIONAL, -- Need R
```

TABLE 1-continued

```
q-RxLevMinOffsetCellSUL INTEGER (1...8) OPTIONAL, -- Need R
q-QualMinOffsetCell INTEGER (1...8) OPTIONAL, -- Need R
...
}
IntraFreqNeighCellInfo-v1610 ::= SEQUENCE {
ssb-PositionQCL-r16 SSB-PositionQCL-Relation-r16 OPTIONAL -- Cond SharedSpectrum2
}
IntraFreqBlackCellList ::= SEQUENCE (SIZE (1... maxCellBlack)) OF PCI-Range
IntraFreqWhiteCellList-r16 ::= SEQUENCE (SIZE (1...maxCellWhite)) OF PCI-Range
IntraFreqCAG-CellListPerPLMN-r16 ::= SEQUENCE {
plmn-IdentityIndex-r16 INTEGER (1...maxPLMN),
cag-CellList-r16 SEQUENCE (SIZE (1...maxCAG-Cell-r16)) OF PCI-Range
}
```

In some implementations, the SIB3 (or a concerned information element included in the SIB3, such as IntraFreqNeighCellInfo-v1610 that is associated with an ssb-PositionQCL-r16) may be associated with a RAT, RAN, or cell SAP such that the UE may apply SIB3 for cell selection or reselection procedure (e.g., only) while the UE is staying in the RAT, RAN, or cell SAP of the SIB3. In some other implementations, the UE may not apply the stored SIB3 (or the concerned IE) while the UE is not staying in the RAT, RAN, or cell SAP that is associated with the SIB3.

In some implementations, the IntraFreqNeighCellInfo, which may be included in the IntraFreqNeighCellList, may further include a cell identity (e.g., Physical Cell Identity) of a concerned cell with at least one RAT, RAN, or cell SAP that is associated with the PCI. In some such implementations, the UE may access the IntraFreqNeighCellInfo of the concerned cell for cell selection or reselection only during the cell SAP of the concerned cell. In other words, the UE may not access the IntraFreqNeighCellInfoCell of the concerned cell for cell selection or reselection while the UE is not staying in the given cell SAP of the concerned Cell.

In some implementations, one or more information elements in SIB3 may not be impacted by whether or not the UE is staying in the SAP (e.g., associated with SIB3), for example, the IntraFreqBlackCellList or IntraFreqWhiteCellList may not be impacted by the SAP(s) if any one of them is configured in SIB3.

In some implementations, the IntraFreqCAG-CellListPerPLMN, which may be transmitted via the intraFreqCAG-CellList to be configured with Closed Access Group associated with a PLMN (ID), may be further associated with a (e.g., RAN) SAP. In other words, the given RAN SAP may be associated with a concerned PLMN. In some implementations, the UE may access the intraFreqCAG-CellList only during the (e.g., RAT) SAP of the concerned PLMN. In some other implementations, the UE may not access the IntraFreqCAG-CellListPerPLMN (e.g., associated with the concerned PLMN) while the UE is not staying in the (e.g., RAN) SAP that is associated with the PLMN. In some implementations, the mechanisms above are not limited to the PLMN but may also be applicable to other network types (e.g., SNPN).

In some implementations, the UE may suspend, keep, or retain all or part of the intra-frequency cell selection or reselection configuration (e.g., all or part of the information elements in the SIB3) regardless of whether the UE is or is not staying in the RAT, RAN, or cell SAP(s) that is associated with the SIB3. In other words, the intra-frequency cell selection or reselection configuration may be retained, maintained, or kept even if the UE moves out of the SAPs that are associated with the intra-frequency cell selection or reselection configuration in SIB3. In some additional implementations, the UE may reuse or reapply all or part of the suspended, kept, or retained intra-frequency cell selection or reselection configuration if the UE moves back to the RAT, RAN, or cell SAP(s) that is associated with the SIB3.

In some implementations, the UE may release all or part of the intra-frequency cell selection or reselection configurations (e.g., all or part of the information elements in the SIB3) after the UE moves out of the RAT, RAN, or cell SAP(s) that is associated with the SIB3. In other words, the intra-frequency cell selection or reselection configuration may be maintained only while the UE stays in the SAPs that are associated with the intra-frequency measurement configuration in SIB3. In some additional implementations, the UE may need to re-obtain or update the intra-frequency cell selection or reselection configuration (e.g., the SIB3) every time while the UE moves to the SAP(s) of SIB3 again.

In some implementations, the UE may suspend, keep, retain all or part of the intra-frequency measurement results/reports (e.g., the measurement results/reports that the UE obtains based on the SIB3) regardless of whether the UE is or is not staying in the RAT, RAN, or cell SAP(s) that is associated with the SIB3. In other words, the intra-frequency measurement results/reports may be retained, maintained, or kept even if the UE moves out of the SAPs that are associated with the intra-frequency measurement/report configuration in SIB3. In some additional implementations, the UE may reuse or reapply all or part of the suspended, kept, or retained intra-frequency measurement results/reports if the UE moves back to the RAT, RAN, or cell SAP(s) that is associated with the intraFreqNeighCellList configuration in SIB3. In some implementations, the mechanisms described above may also be applicable to an IE (e.g., IE(s)) in the SIB3) while the IE is further associated with one or more RAT, RAN, or cell SAP(s).

In some implementations, the UE may release all or part of the intra-frequency measurement results/reports (e.g., the measurement results/reports that the UE obtains based on the SIB3) after the UE moves out of the RAT, RAN, or cell SAP(s) that is associated with the SIB3. In other words, the intra-frequency measurement results/reports may be maintained only while the UE stays in the SAPs associated with the intra-frequency measurement configuration in SIB3.

In some implementations, the UE may determine whether to reuse or drop all or part of the stored intra-frequency measurement results/reports while the UE transitions between the RAT, RAN, or cell SAP(s) and the RAT, RAN, or cell Service Unavailable Period(s) of SIB3. In some implementations, the UE may reuse or drop all or part of the stored intra-frequency measurement results/reports while the UE is out of a RAT, RAN, or cell coverage area.

In some implementations, the serving Cell (e.g., Cell #1) may broadcast an information element contained in SIB4 or SIB4 that may be further associated with the one or more RAT, RAN, or cell SAPs.

In 3GPP, SIB4 contains information relevant for inter-frequency cell re-selection, for example, information about other NR frequencies and inter-frequency neighboring cells relevant for cell reselection, which may also be used for NR Idle or inactive measurements. The IE includes cell re-selection parameters common for a frequency as well as cell specific re-selection parameters. In some implementations, an example of the SIB4 is provided based on the 3GPP TS 38.331, as shown in Table 2 below.

TABLE 2

```
SIB4 ::= SEQUENCE {
interFreqCarrierFreqList InterFreqCarrierFreqList,
lateNonCriticalExtension OCTET STRING OPTIONAL,
...,
[[
interFreqCarrierFreqList-v1610 InterFreqCarrierFreqList-v1610 OPTIONAL -- Need R
]]
}
InterFreqCarrierFreqList ::= SEQUENCE (SIZE (1...maxFreq)) OF InterFreqCarrierFreqInfo
InterFreqCarrierFreqList-v1610  ::=  SEQUENCE  (SIZE  (1..maxFreq))  OF
InterFreqCarrierFreqInfo-v1610
InterFreqCarrierFreqInfo ::= SEQUENCE {
dl-CarrierFreq ARFCN-ValueNR,
frequencyBandList MultiFrequencyBandListNR-SIB OPTIONAL, -- Cond Mandatory
frequencyBandListSUL MultiFrequencyBandListNR-SIB OPTIONAL, -- Need R
nrofSS-BlocksToAverage INTEGER (2...maxNrofSS-BlocksToAverage) OPTIONAL, -- Need
S
absThreshSS-BlocksConsolidation ThresholdNR OPTIONAL, -- Need S
smtc SSB-MTC OPTIONAL, -- Need S
ssbSubcarrierSpacing SubcarrierSpacing,
ssb-ToMeasure SSB-ToMeasure OPTIONAL, -- Need S
deriveSSB-IndexFromCell BOOLEAN,
ss-RSSI-Measurement SS-RSSI-Measurement OPTIONAL,
q-RxLevMin Q-RxLevMin,
q-RxLevMinSUL Q-RxLevMin OPTIONAL, -- Need R
q-QualMin Q-QualMin OPTIONAL, -- Need S
p-Max P-Max OPTIONAL, -- Need S
t-ReselectionNR T-Reselection,
t-ReselectionNR-SF SpeedStateScaleFactors OPTIONAL, -- Need S
threshX-HighP ReselectionThreshold,
threshX-LowP ReselectionThreshold,
threshX-Q SEQUENCE {
threshX-HighQ ReselectionThresholdQ,
threshX-LowQ ReselectionThresholdQ
} OPTIONAL, -- Cond RSRQ
cellReselectionPriority CellReselectionPriority OPTIONAL, -- Need R
cellReselectionSubPriority CellReselectionSubPriority OPTIONAL, -- Need R
q-OffsetFreq Q-OffsetRange DEFAULT dB0,
interFreqNeighCellList InterFreqNeighCellList OPTIONAL, -- Need R
interFreqBlackCellList InterFreqBlackCellList OPTIONAL, -- Need R
...
}
InterFreqCarrierFreqInfo-v1610 ::= SEQUENCE {
interFreqNeighCellList-v1610 InterFreqNeighCellList-v1610 OPTIONAL, -- Need R
smtc2-LP-r16 SSB-MTC2-LP-r16 OPTIONAL, -- Need R
interFreqWhiteCellList-r16  InterFreqWhiteCellList-r16  OPTIONAL,  --  Cond
SharedSpectrum2
ssb-PositionQCL-Common-r16 SSB-PositionQCL-Relation-r16 OPTIONAL, -- Cond
SharedSpectrum
interFreqCAG-CellList-r16 SEQUENCE (SIZE (1...maxPLMN)) OF InterFreqCAG-
CellListPerPLMN-r16 OPTIONAL -- Need R
}
InterFreqNeighCellList ::= SEQUENCE (SIZE (1...maxCellInter)) OF InterFreqNeighCellInfo
InterFreqNeighCellList-v1610  ::=  SEQUENCE  (SIZE  (1...maxCellInter))  OF
InterFreqNeighCellInfo-v1610
InterFreqNeighCellInfo ::= SEQUENCE {
physCellId PhysCellId,
q-OffsetCell Q-OffsetRange,
q-RxLevMinOffsetCell INTEGER (1...8) OPTIONAL, -- Need R
q-RxLevMinOffsetCellSUL INTEGER (1...8) OPTIONAL, -- Need R
q-QualMinOffsetCell INTEGER (1...8) OPTIONAL, -- Need R
...
}
InterFreqNeighCellInfo-v1610 ::= SEQUENCE {
ssb-PositionQCL-r16 SSB-PositionQCL-Relation-r16 OPTIONAL - Cond SharedSpectrum2
}
InterFreqBlackCellList ::= SEQUENCE (SIZE (1...maxCellBlack)) OF PCI-Range
InterFreqWhiteCellList-r16 ::= SEQUENCE (SIZE (1...maxCellWhite)) OF PCI-Range
```

TABLE 2-continued

```
InterFreqCAG-CellListPerPLMN-r16 ::= SEQUENCE {
plmn-IdentityIndex-r16 INTEGER (1...maxPLMN),
cag-CellList-r16 SEQUENCE (SIZE (1...maxCAG-Cell-r16)) OF PCI-Range
}
```

In some implementations, the SIB4 (or a concerned information element included in the SIB4, such as InterFreqNeighCellInfo-v1610 associated with an ssb-Position-QCL-r16) may be associated with a RAT, RAN, or cell SAP such that the UE may apply SIB4 for cell selection or reselection procedure (e.g., only) while the UE stays in the RAT, RAN, or cell SAP of the SIB4. In some other implementations, the UE may not apply the stored SIB4 (e.g., or the concerned IE) while the UE is not staying in the RAT, RAN, or cell SAP that is associated with the SIB4.

In some implementations, the InterFreqNeighCellInfo, which may be included in the InterFreqNeighCellList, may further include a cell identity (e.g., Physical Cell Identity) of a concerned cell with at least one RAT, RAN, or cell SAP that is associated with the PCI. In some such implementations, the UE may access the InterFreqNeighCellInfo of the concerned cell for cell selection or reselection only during the (e.g., cell) SAP of the concerned cell. In other words, the UE may not access the InterFreqNeighCellInfoCell of the concerned cell for cell selection or reselection while the UE is not staying in the given (e.g., cell) SAP of the concerned cell.

In some implementations, one or more information elements in SIB4 may not be impacted by whether or not the UE stays in the SAP (e.g., associated with SIB4), for example, the InterFreqBlackCellList or InterFreqWhiteCellList may not be impacted by the SAP(s) if any one of the two elements above is configured in SIB4.

In some implementations, the InterFreqCAG-CellListPerPLMN, which may be transmitted via the interFreqCAG-CellList to be configured with Closed Access Group associated with a PLMN (ID), may be further associated with a (e.g., RAN) SAP. In other words, the given RAN SAP may be associated with a concerned PLMN. In some implementations, the UE may access the interFreqCAG-CellList only during the (e.g., RAT) SAP of the concerned PLMN. In some other implementations, the UE may not access the InterFreqCAG-CellListPerPLMN (e.g., associated with the concerned PLMN) while the UE is not staying in the (e.g., RAN) SAP that is associated with the PLMN. In some implementations, the mechanisms described above are not limited to the PLMN but may also be applicable to other network types (e.g., SNPN).

In some implementations, the InterFreqCarrierFreqInfo (e.g., transmitted via SIB4) may be further associated with one or more (e.g., RAT) SAP, for example, the IE 'dl-CarrierFreq' in the InterFreqCarrierFreqInfo may be further associated with one or more (e.g., NR RAT) SAP(s). In some implementations, regarding an InterFreqCarrierFreqInfo associated with a RAT SAP, the UE may access the InterFreqCarrierFreqInfo (e.g., only) during a correspondingly associated SAP(s). In some other implementations, the UE may not access the InterFreqCarrierFreqInfo for inter-frequency cell selection or reselection while the UE is not staying in the (e.g., RAT) SAP of the concerned NR frequency carrier. In some implementations, the mechanisms above may also be applicable to the IEs in the InterFreqCarrierFreqInfo (e.g., smtc, cellReselectionPriority, cellReselectionSubPriority, or interFreqNeighCellList).

In some implementations, the UE may obtain the InterFreqCarrierFreqInfo (e.g., smtc, cellReselectionPriority, cellReselectionSubPriority, or interFreqNeighCellList) via broadcasting system information. In some other implementations, the UE may obtain (any combination of) the information elements in InterFreqCarrierFreqInfo (e.g., smtc, cellReselectionPriority, cellReselectionSubPriority, or interFreqNeighCellList) via DL UE-specific control signaling, such as an RRC(Connection)Release message reception (e.g., based on E-UTRA/NR protocols). In some implementations, the UE may receive (any combination of) the information elements in the InterFreqCarrierFreqInfo by receiving one (or more) RRCRelease message with suspend configuration, which may instruct the UE to move to an (E-UTRA/NR) RRC Inactive state. As such, after moving to the (E-UTRA/NR) RRC Inactive state, the UE may perform a (inter-frequency/inter-RAT) cell (re)selection procedure based on the InterFreqCarrierFreqInfo received in the RRC Release message.

In some other implementations, the UE may receive the InterFreqCarrierFreqInfo by receiving one (or more) RRC (Connection)Release message without suspend configuration, which may instruct the UE to move to an (E-UTRA/NR) RRC Idle state (e.g., based on E-UTRA/NR protocols). As such, after moving to the RRC Idle state, the UE may perform a (inter-frequency/inter-RAT) cell (re)selection procedure based on the InterFreqCarrierFreqInfo received in the RRCRelease message. The cell (re)selection procedure (and the stored InterFreqCarrierFreqInfo) implemented after receiving the RRCRelease message may also be impacted by the disclosed (RAT/RAN/Cell) SAPs and Service Un-available Periods.

In some implementations, a UE may receive the InterFreqCarrierFreqInfo (e.g., CellReselectionPriority) with a t320 value within the RRCRelease message. After receiving the RRCRelease message (e.g., with CellReselectionPriority and t320), the UE may start to count a timer T320 to zero by setting the initial value of T320 to t320. The UE may implement a cell (re)selection procedure based on the received (e.g., and then stored by the UE) CellReselectionPriority while the timer T320 is counting. The UE may then release/drop the stored CellReselectionPriority when the timer T320 expires which means that the UE may not follow the priority rules given by the CellReselectionPriority after T320 expiry. As such, to prevent the UE from releasing the stored CellReselectionPriority during the service unavailable period of the serving RAN, in some implementations, the UE may stop counting the T320 during the (RAT/RAN/Cell) Service Unavailable Periods. In addition, the UE may restart the stopped T320 to zero during the next (RAT/RAN/Cell) Service Available Periods. In addition, the UE may reapply the stored CellReselectionPriority for cell (re)selection procedure while the T320 is being recounted by the UE during the next (RAT/RAN/Cell) Available Periods again. It should be noted that, in some implementations, the UE may keep counting the T320 during the (RAT/RAN/Cell) Service Unavailable Periods. The UE may then release/drop the stored InterFreqCarrierFreqInfo (e.g., CellReselectionPriority) after the T320 expires during the (RAT/RAN/Cell) Service Unavailable Periods.

In some implementations, CellReselectionPriority is associated with a target (E-UTRA/NR) frequency carrier to indicate the absolute priority of the associated frequency carrier for the UE to implement cell (re)selection between a group of candidate frequency carriers. In some implementations, the value of CellReselectionPriority is presented by a integer within a range (0~7). The value 0 means the lowest priority and the value 7 means the highest priority.

In some implementations, CellReselectionSubPriority is associated with a target (E-UTRA/NR) frequency carrier to indicate the absolute priority of the associated frequency carrier for the UE to implement cell (re)selection between a group of candidate frequency carriers. The value of CellReselectionSubPriority indicates a fractional priority value (of one target frequency carrier) to be added to the cellReselectionPriority value of the same the target frequency carrier. So, the UE would obtain the absolute cell (re) selection priority of the concerned target frequency carrier (for E-UTRA/NR cell (re)selection procedure) by adding up the CellReselectionPriority CellReselectionSubPriority value (if it is configured). In some implementations, the value of CellReselectionSubPriority may be decided within one of the given range {0.2, 0.4, 0.6, 0.8}. In some implementations, the value of CellReselectionPriority is presented by a integer within a range (0~7). The value 0 means the lowest priority and the value 7 means the highest priority.

In some implementations, the UE may suspend, keep, or retain all or part of the inter-frequency cell selection or reselection configuration (e.g., all or part of the information elements in the SIB4) regardless of whether the UE is or is not staying in the RAT, RAN, or cell SAP(s) that is associated with the SIB4. In other words, the inter-frequency cell selection or reselection configuration may be retained, maintained, or kept even if the UE moves out of the SAPs that are associated with the inter-frequency cell selection or reselection configuration in SIB4. In some additional implementations, the UE may reuse reapply all or part of the suspended, kept, retained inter-frequency cell selection or reselection configuration if the UE moves back to the RAT, RAN, or cell SAP(s) that is associated with the SIB4.

In some implementations, the UE may release all or part of the inter-frequency cell selection or reselection configurations (e.g., all or part of the information elements in the SIB4) after the UE moves out of the RAT, RAN, or cell SAP(s) that is associated with the SIB4. In other words, the inter-frequency cell selection or reselection configuration may be maintained only while the UE stays in the SAPs that are associated with the intra-frequency measurement configuration in SIB4. In some additional implementations, the UE may need to re-obtain or update the inter-frequency cell selection or reselection configuration (e.g., the SIB4) every time while the UE moves to the SAP(s) of SIB4 again.

In some implementations, the UE may suspend, keep, retain all or part of the inter-frequency measurement results/ reports (e.g., the measurement results/reports that the UE obtains based on the SIB4) regardless of whether the UE is or is not staying in the RAT, RAN, or cell SAP(s) that is associated with the SIB4. In other words, the inter-frequency measurement results/reports may be retained, maintained, kept even the UE moves out of the SAPs that are associated with the inter-frequency measurement/report configuration in SIB4. In some additional implementations, the UE may reuse or reapply all or part of the suspended, kept, retained inter-frequency measurement results/reports if the UE moves back to the RAT, RAN, or cell SAP(s) that is associated with the inter-frequency cell selection or reselection configuration in SIB4. In some implementations, the mechanisms described above may also be applicable to an IE (e.g., IE(s) in the SIB4) while the IE is further associated with one or more RAT, RAN, or cell SAP(s).

In some implementations, the UE may release all or part of the inter-frequency measurement results/reports (e.g., the measurement results/reports that the UE obtains based on the SIB4) after the UE moves out of the RAT, RAN, or cell SAP(s) that is associated with the SIB4. In other words, the inter-frequency measurement results/reports may be maintained only while the UE stays in the SAPs that are associated with the inter-frequency measurement/report configuration in SIB4.

In some implementations, the UE may determine whether to reuse or drop all or part of the stored inter-frequency measurement results/reports while the UE transitions between the RAT, RAN, or cell SAP(s) and the RAT, RAN, or cell Service Unavailable Period(s) of SIB4.

In some implementations, the SAP configuration may also be delivered by the base station or cell via system information for the UE to implement inter-RAT cell re-selection, for example, an E-UTRA cell may configure the RAT, RAN, or cell SAP(s) to be associated with the systeminfonnationBlockType24.

Based on the E-UTRA protocols in 3GPP TS 36.331, the IE SystemInformationBlockType24 contains information relevant for inter-RAT cell re-selection (i.e., information about NR frequencies and NR neighboring cells relevant for cell re-selection), which may also be used for NR Idle or inactive measurements. The IE includes cell re-selection parameters common for a frequency. In some implementations, an example of SystemInformationBlockType24 is provided based on 3GPP TS 36.331, as shown in Table 3 below.

TABLE 3

SystemInformationBlockType24-r15 ::= SEQUENCE {
carrierFreqListNR-r15 CarrierFreqListNR-r15 OPTIONAL, -- Need OR
t-ReselectionNR-r15 T-Reselection,
t-ReselectionNR-SF-r15 SpeedStateScaleFactors OPTIONAL, -- Need OR
lateNonCriticalExtension OCTET STRING OPTIONAL,
...,
[[ carrierFreqListNR-v1610 CarrierFreqListNR-v1610 OPTIONAL -- Need OR]]
}
CarrierFreqListNR-r15 ::= SEQUENCE (SIZE (1...maxFreq)) OF CarrierFreqNR-r15
CarrierFreqListNR-v1610 ::= SEQUENCE (SIZE (1...maxFreq)) OF CarrierFreqNR-v1610
CarrierFreqNR-r15 ::= SEQUENCE {
carrierFreq-r15 ARFCN-ValueNR-r15,
multiBandInfoList-r15 MultiFrequencyBandListNR-r15 OPTIONAL, -- Need OR
multiBandInfoListSUL-r15 MultiFrequencyBandListNR-r15 OPTIONAL, -- Need OR

TABLE 3-continued

```
measTimingConfig-r15 MTC-SSB-NR-r15 OPTIONAL, -- Need OR
subcarrierSpacingSSB-r15 ENUMERATED {kHz15, kHz30, kHz120, kHz240},
ss-RSSI-Measurement-r15 SS-RSSI-Measurement-r15 OPTIONAL, -- Cond RSRQ2
cellReselectionPriority-r15 CellReselectionPriority OPTIONAL, -- Need OP
cellReselectionSubPriority-r15 CellReselectionSubPriority-r13 OPTIONAL, -- Need OR
threshX-High-r15 ReselectionThreshold,
threshX-Low-r15 ReselectionThreshold,
threshX-Q-r15 SEQUENCE {
threshX-HighQ-r15 ReselectionThresholdQ-r9,
threshX-LowQ-r15 ReselectionThresholdQ-r9
} OPTIONAL, -- Cond RSRQ
q-RxLevMin-r15 INTEGER (-70...-22),
q-RxLevMinSUL-r15 INTEGER (-70...-22) OPTIONAL, -- Need OR
p-MaxNR-r15 P-MaxNR-r15,
ns-PmaxListNR-r15 NS-PmaxListNR-r15 OPTIONAL, -- Need OR
q-QualMin-r15 INTEGER (-43...-12) OPTIONAL, -- Need OP
deriveSSB-IndexFromCell-r15 BOOLEAN,
maxRS-IndexCellQual-r15 MaxRS-IndexCellQualNR-r15 OPTIONAL, -- Need OR
threshRS-Index-r15 ThresholdListNR-r15 OPTIONAL, -- Need OR...,
[[ multiBandNsPmaxListNR-v1550 MultiBandNsPmaxListNR-1-v1550 OPTIONAL, -- Need
OR
multiBandNsPmaxListNR-SUL-v1550 MultiBandNsPmaxListNR-v1550 OPTIONAL, -- Need
OR
ssb-ToMeasure-r15 SSB-ToMeasure-r15 OPTIONAL -- Need OR]]
}
CarrierFreqNR-v1610 ::= SEQUENCE {
smtc2-LP-r16 MTC-SSB2-LP-NR-r16 OPTIONAL, -- Need OR
ssb-PositionQCL-CommonNR-r16 SSB-PositionQCL-RelationNR-r16 OPTIONAL, -- Cond
SharedSpectrum
whiteCellListNR-r16 WhiteCellListNR-r16 OPTIONAL, -- Cond
SharedSpectrum
highSpeedCarrierNR-r16 ENUMERATED {true} OPTIONAL -- Need OR
}
MultiBandNsPmaxListNR-1-v1550 ::= SEQUENCE (SIZE (1... maxMultiBandsNR-1-r15))
OF NS-PmaxListNR-r15
MultiBandNsPmaxListNR-v1550 ::= SEQUENCE (SIZE (1... maxMultiBandsNR-r15)) OF
NS-PmaxListNR-r15
WhiteCellListNR-r16 ::= SEQUENCE (SIZE (1...maxCellWhiteNR-r16)) OF PhysCellIdNR-
r15
```

In some implementations, the SystemInformationBlockType24 (or a concerned information element included in the SystemInformationBlockType24, such as t-ReselectionNR, CarrierFreqListNR-r15, and/or CarrierFreqListNR-v1610) may be associated with a RAT, RAN, or cell SAP and so the UE may apply SystemInformationBlockType24 for inter-RAT cell selection or reselection procedure (e.g., only) while the UE stays in the RAT, RAN, or cell SAP of the SystemInformationBlockType24. In other implementations, the UE may not apply the stored SystemInformationBlockType24 (or the concerned IE(s)) while the UE is not staying in the RAT, RAN, or cell SAP that is associated with the SystemInformationBlockType24.

In some implementations, the information elements in the NR frequency list (e.g., CarrierFreqNR-r15 and/or CarrierFreqNR-v1610) may be further associated with one or more RAT, RAN, or cell SAPs, for example, a CarrierFreqNR-r15 may include a carrierFreq-r15 (e.g., represented by an ARFCN-ValueNR value) and one or more RAT SAP(s) such that the UE may access the CarrierFreqNR-r15 and implement the inter-RAT cell selection or reselection procedure (e.g., only) while the UE stays in the RAT, RAN, or cell SAP of the CarrierFreqNR-r15. In other implementations, the UE may not apply the stored CarrierFreqNR-r15 for inter-RAT cell selection or reselection procedure while the UE is not staying in the RAT, RAN, or cell SAP that is associated with the CarrierFreqNR-r15. In some implementations, the mechanisms described above may also be applicable to the all or part of the IEs in the CarrierFreqNR-r15 (e.g., subcarrierSpacingSSB-r15, measTimingConfig-r15, ss-RSSI-Measurement-r15, etc.).

In some implementations, the mechanisms described above may also be applicable to CarrierFreqNR-v1610 and the information element associated with the CarrierFreqNR-v1610 (e.g., smtc2-LP-r16 or ssb-PositionQCL-CommonNR-r16).

In some other implementations, the information elements in the NR frequency list (e.g., CarrierFreqNR-r15 and/or CarrierFreqNR-v1610) may be further associated with one or more cell SAPs, for example, a CarrierFreqNR-r15 may include a carrierFreq-r15 (e.g., represented by an ARFCN-ValueNR value) and one or more RAT SAP(s) such that the UE may access the CarrierFreqNR-r15 and implement the inter-RAT cell selection or reselection procedure (e.g., only) while the UE stays in the RAT, RAN, or cell SAP of the CarrierFreqNR-r15. In other implementations, the UE may not apply the stored CarrierFreqNR-r15 for inter-RAT cell selection or reselection procedure while the UE is not staying in the RAT, RAN, or cell SAP that is associated with the CarrierFreqNR-r15. In some implementations, the mechanisms as described above may also be applicable to the all or part of the IEs in the CarrierFreqNR-r15 (e.g., subcarrierSpacingSSB-r15, measTimingConfig-r15, ss-RSSI-Measurement-r15).

In some implementations, the mechanisms described above may also be applicable to CarrierFreqNR-v1610 and the information element associated with the CarrierFreqNR-v1610 (e.g., smtc2-LP-r16 or ssb-PositionQCL-CommonNR-r16).

In some implementations, one or more information elements in SystemInformationBlockType24-r15 may not be impacted by whether or not the UE stays in the SAP (e.g., associated with SystemInformationBlockType24-r15), for example, the CarrierFreqNR-r15 and/or CarrierFreqNR-v1610 may not be impacted by the SAP(s) if any one of the two elements is configured in SystemInformationBlockType24-r15.

In some implementations, the UE may release the stored inter-RAT cell selection or reselection configuration (e.g., SystemInformationBlockType24-r15) if the UE is not staying in the RAT, RAN, or cell SAP(s) that is associated with the SystemInformationBlockType24-r15. In other words, the UE may store and access the SystemInformationBlockType24-r15 only during the corresponding SAP(s)). In some additional implementations, the UE may need to re-obtain or update the inter-frequency cell selection or reselection configuration (e.g., the SIB4) every time while the UE moves to the SAP(s) of SystemInformationBlockType24-r15 again.

In some implementations, the UE may release the stored inter-RAT measurement results/reports, which may be measured by the UE based on the given SystemInformationBlockType24-r15, if the UE is not staying in the RAT, RAN, or cell SAP(s) that is associated with the SystemInformationBlockType24-r15. In other words, the UE may keep or store the inter-RAT measurement results/reports only during the SAP(s) that is associated with SystemInformationBlockType24-r15.

In some implementations, the UE may suspend, keep, or retain all or part of the inter-RAT cell selection or reselection configuration (e.g., SystemInformationBlockType24-r15) regardless of whether the UE is or is not staying in the RAT, RAN, or cell SAP(s) that is associated with the inter-RAT cell selection or reselection configuration. In other words, the inter-RAT cell selection or reselection configuration may be retained, maintained, kept even if the UE moves out of the SAPs that are associated with the inter-RAT cell selection or reselection configuration in the SystemInformationBlockType24-r15. In some additional implementations, the UE may reuse or reapply all or part of the suspended, kept, or retained inter-RAT cell selection or reselection configuration if the UE moves back to the RAT, RAN, or cell SAP(s) that is associated with the inter-RAT cell selection or reselection configuration.

In some implementations, the mechanisms described above may also be applicable to an IE (e.g., IE(s) in the SystemInformationBlockType24-r15) while the IE is further associated with one or more RAT, RAN, or cell SAP(s).

In some implementations, the UE may suspend, keep, or retain all or part of the inter-RAT measurement results/reports, for example, the measurement results/reports that the UE obtains based on the inter-RAT cell selection or reselection configuration via the SystemInformationBlockType24-r15, regardless of whether the UE is or is not staying in the RAT, RAN, or cell SAP(s) that is associated with the inter-RAT cell selection or reselection configuration. In other words, the inter-RAT measurement results/reports may be retained, maintained, or kept even if the UE moves out of the SAPs that are associated with the inter-RAT measurement/report configuration in SystemInformationBlockType24-r15. In some additional implementations, the UE may reuse or reapply all or part of the suspended, kept, or retained inter-RAT frequency measurement results if the UE moves back to the RAT, RAN, or cell SAP(s) that is associated with the inter-RAT cell selection or reselection configuration.

In some implementations, the UE may determine whether to reuse or drop all or part of the stored inter-RAT measurement results/reports while the UE transitions between the RAT, RAN, or cell SAP(s) and the RAT, RAN, or cell Unavailable Period(s).

In some implementations, the SAP configuration may also be delivered by the base station or cell via system information for the UE to implement a NarrowBand Internet-of-Things (NB-IoT) operation. In some implementations, the NB-IoT operation may be implemented over an NTN, for example, an E-UTRA Cell may configure the RAT, RAN, or cell SAP(s) to be associated with the SystemInformationBlockType27, which may contain a NB-IoT configuration.

Based on E-UTRA protocols in 3GPP TS 36.331, the IE SystemInformationBlockType27 contains information relevant for a NB-IoT configuration. In some implementations, an example of SystemInformationBlockType27 is provided based on 3GPP TS 36.331, as shown in Table 4 below.

TABLE 4

SystemInformationBlockType27-r16 ::= SEQUENCE {
carrierFreqListNBIOT-r16 CarrierFreqListNBIOT-r16
OPTIONAL, -- Need OR
lateNonCriticalExtension OCTET STRING OPTIONAL,
...
}
CarrierFreqListNBIOT-r16 ::= SEQUENCE (SIZE
(1...maxFreqNBIOT-r16)) OF
CarrierFreqNBIOT-r16
CarrierFreqNBIOT-r16 ::= SEQUENCE {
carrierFreq-r16 ARFCN-ValueEUTRA-r9,
carrierFreqOffset-r16 ENUMERATED {v-10, v-9, v-8dot5,
v-8, v-7, v-6, v-5, v-4dot5,
v-4,v-3, v-2, v-1, v-0dot5, v0, v1, v2, v3, v3dot5,
v4, v5, v6, v7, v7dot5, v8, v9}
}

In some implementations, the SystemInformationBlockType27 (or a concerned information element included in the SystemInformationBlockType27, such as carrierFreqListNBIOT-r16, carrierFreq-r16, or carrierFreqOffset) may be associated with a RAT, RAN, or cell SAP such that the UE may apply SystemInformationBlockType27 for NB-IoT cell selection or reselection procedure (e.g., only) while the UE stays in the RAT, RAN, or cell SAP of the SystemInformationBlockType27. In other implementations, the UE may not apply the stored SystemInformationBlockType27 (or the concerned IE(s)) while the UE is not staying in the RAT, RAN, or cell SAP that is associated with the SystemInformationBlockType27.

In some implementations, the information elements in the CarrierFreqListNBIOT, for example, CarrierFreqNBIOT-r16 or the information elements included in the CarrierFreqNBIOT-r16, such as carrierFreq-r16 or carrierFreqOffset-r16, may be further associated with one or more RAT, RAN, or cell SAPs, for example, a CarrierFreqNBIOT-r16 may include a carrierFreq-r16 (e.g., represented by an ARFCN-ValueE-UTRA value or ARFCN-ValueNR value) and one or more RAT SAP(s) such that the UE may access the CarrierFreqNBIOT-r16 to implement the NB-IoT cell selection or reselection procedure (e.g., only) while the UE stays in the RAT, RAN, or cell SAP of the CarrierFreqNBIOT-r16. In other implementations, the UE may not apply the stored CarrierFreqNBIOT-r16 for NB-IoT cell selection or reselection procedure while the UE is not staying in the RAT, RAN, or cell SAP that is associated with the CarrierFreqNBIOT-r16. In some implementations, the mechanisms described above may also be applicable to the all or part of the IEs in the CarrierFreqNBIOT-r16.

In some implementations, the mechanisms described above may also be applicable to the information element associated with the CarrierFreqNBIOT-r16 (e.g., carrierFreq-r16 or carrierFreqOffset-r16).

In some implementations, one or more information elements configured in the NB-IoT Cell selection or reselection configuration (e.g., SystemInformationBlockType27) may not be impacted by whether or not the UE stays in the SAP (e.g., associated with SystemInformationBlockType27), for example, the CarrierFreqNBIOT-r16 may not be impacted by the SAP(s) if the CarrierFreqNBIOT-r16 is configured in SystemInformationBlockType27-r16.

In some implementations, the UE may release the stored NB-IoT cell selection or reselection configuration (e.g., SystemInformationBlockType27-r16) if the UE is not staying in the RAT, RAN, or cell SAP(s) that is associated with the SystemInformationBlockType27-r16. In other words, the UE may store and access the SystemInformationBlockType27-r16 only during the corresponding SAP(s). In some additional implementations, the UE may need to re-obtain or update the NB-IoT cell selection or reselection configuration (e.g., the SystemInformationBlockType27-r16) every time while the UE moves to the SAP(s) of SystemInformationBlockType27-r16 again.

In some implementations, the UE may release the stored NB-IoT measurement results/reports, which may be measured by the UE based on the given SystemInformationBlockType27-r16, if the UE is not staying in the RAT, RAN, or cell SAP(s) that is associated with the SystemInformationBlockType27-r16. In other words, the UE may keep or store the NB-IoT measurement results/reports only during the SAP(s) that is associated with SystemInformationBlockType27-r16.

In some implementations, the UE may suspend, keep, or retain all or part of the NB-IoT cell selection or reselection configuration (e.g., SystemInformationBlockType27-r16) regardless of whether the UE is or is not staying in the RAT, RAN, or cell SAP(s) that is associated with the NB-IoT cell selection or reselection configuration. In other words, the NB-IoT cell selection or reselection configuration may be retained, maintained, or kept even if the UE moves out of the SAPs that are associated with the NB-IoT cell selection or reselection configuration in the SystemInformationBlockType27-r16. In some additional implementations, the UE may reuse or reapply all or part of the suspended, kept, or retained NB-IoT cell selection or reselection configuration if the UE moves back to the RAT, RAN, or cell SAP(s) that is associated with the NB-IoT cell selection or reselection configuration.

In some implementations, the mechanisms described above may also be applicable to an IE (e.g., IE(s) in the SystemInformationBlockType27-r16) while the IE is further associated with one or more RAT, RAN, or cell SAP(s).

In some implementations, the UE may suspend, keep, retain all or part of the NB-IoT measurement results, for example, the measurement results/reports that the UE obtains based on the NB-IoT cell selection or reselection configuration via the SystemInformationBlockType24-r15, regardless of whether the UE is or is not staying in the RAT, RAN, or cell SAP(s) that is associated with the NB-IoT cell selection or reselection configuration. In other words, the NB-IoT measurement results/reports may be retained, maintained, or kept even if the UE moves out of the SAPs that are associated with the NB-IoT measurement/report configuration in SystemInformationBlockType24-r15. In some additional implementations, the UE may reuse or reapply all or part of the suspended, kept, or retained NB-IoT frequency measurement results/reports if the UE moves back to the RAT, RAN, or cell SAP(s) that is associated with the NB-IoT cell selection or reselection configuration.

In some implementations, the UE may determine whether to reuse or drop all or part of the stored NB-IoT measurement results/reports while the UE transitions between the RAT, RAN, or cell SAP(s) and the RAT, RAN, or cell Unavailable Period(s).

In some implementations, the RAT, RAN, or cell SAP may be applied for coverage holes (e.g., Unavailable Period (s)) in a scenario of a cube satellite deployment. In some implementations, SAP, satellite ephemeris information provided by a NW, or UE location acquired by a GNSS may handle coverage holes or discontinuous satellite coverage in a power-efficient way.

In some implementations, the SAP configuration may also be delivered by the base station or cell via system information for the UE to implement an E-UTRA-NR-Dual Connectivity (EN-DC) operation. For example, a master node may be an E-UTRA cell that broadcast system information (e.g., the SystemInformationBlockType26a) to deliver the NR bands, which may be used for an EN-DC with the serving cell.

In some implementations, the EN-DC operation may be implemented over NTNs. In other words, the master node (e.g., master base station or Master eNB (MeNB)) may be an E-UTRA cell, which may be deployed on a TN, and the secondary node (e.g., secondary base station or Secondary gNB (SeNB)) may be an NR cell, which may be deployed on an NTN. For example, an E-UTRA cell may configure the RAT, RAN, or cell SAP(s) to be associated with the SystemInformationBlockType26a, which may contain EN-DC supporting information.

Based on E-UTRA protocols in 3GPP TS 36.331, the IE SystemInformationBlockType26a contains information relevant for EN-DC configuration. In some implementations, an example of SystemInformationBlockType26a is provided based on 3GPP TS 36.331, as shown in Table 5 below.

TABLE 5

SystemInformationBlockType26a-r16 ::= SEQUENCE {
plmn-InfoList-r16 PLMN-InfoList-r16,
bandListENDC-r16 BandListENDC-r16,
lateNonCriticalExtension OCTET STRING OPTIONAL,
...
}
BandListENDC-r16 ::= SEQUENCE (SIZE (1...maxBandsENDC-r16)) OF
FreqBandIndicatorNR-r15
PLMN-InfoList-r16 ::= SEQUENCE (SIZE (0...maxPLMN-r11))
OF PLMN-Info-r16
PLMN-Info-r16 ::= SEQUENCE {
nr-BandList-r16 BIT STRING (SIZE(maxBandsENDC-r16))
OPTIONAL -- Need OR
}

In some implementations, the SystemInformationBlockType26a (or a concerned information element included in the SystemInformationBlockType26a, such as plmn-InfoList-r16/BandListENDC-r16) may be associated with a RAT, RAN, or cell SAP such that the UE may apply SystemInformationBlockType26a to support EN-DC operation (e.g., only) while the UE stays in the RAT, RAN, or cell SAP of the SystemInformationBlockType26a. In other implementations, the UE may not apply the stored SystemInformationBlockType26a (or the concerned IE(s)) while the UE is not staying in the RAT, RAN, or cell SAP that is associated with the SystemInformationBlockType26a.

In some implementations, the information elements in the SystemInformationBlockType26a (e.g., plmn-InfoList-r16, BandListENDC-r16) may be further associated with one or more RAT, RAN, or cell SAPs, for example, a plmn-InfoList-r16 may include at least one PLMN-Info-r16, which may contain nr-BandList-r16, and one or more RAN SAP(s) that is associated with the PLMN-Info-r16 such that the UE may access the PLMN-Info-r16 and implement the EN-DC operation (e.g., only) while the UE stays in the (e.g., RAN) SAP of the PLMN-Info-r16. In other implementations, the UE may not apply the stored PLMN-Info-r16 for EN-DC operation while the UE is not staying in the (e.g., RAN) SAP that is associated with the PLMN-Info-r16. In some implementations, the mechanisms described above may also be applicable to BandListENDC-r16.

In some implementations, one or more information elements in SystemInformationBlockType26a may not be impacted by whether or not the UE stays in the SAP (e.g., associated with SystemInformationBlockType26a). For example, the plmn-InfoList-r16 and/or bandListENDC-r16 may not be impacted by the SAP(s) if any one of the IEs is configured in SystemInformationBlockType26a.

In some implementations, the UE may release the stored supporting information for EN-DC operation (e.g., SystemInformationBlockType26a) if the UE is not staying in the RAT, RAN, or cell SAP(s) that is associated with the SystemInformationBlockType26a. In other words, the UE may store and access the SystemInformationBlockType26a only during the corresponding SAP(s). In some additional implementations, the UE may need to re-obtain or update the SystemInformationBlockType26a every time while the UE moves to the SAP(s) of SystemInformationBlockType26a again.

In some implementations, the UE may release the stored EN-DC measurement results/reports, which may be measured by the UE based on the given SystemInformationBlockType26a, if the UE is not staying in the RAT, RAN, or cell SAP(s) that is associated with the SystemInformationBlockType26a-r16. In other words, the UE may keep or store the EN-DC measurement results/reports only during the SAP(s) that is associated with SystemInformationBlockType26a.

In some implementations, the UE may suspend, keep, or retain all or part of the SystemInformationBlockType26a-r15 even while the UE is or is not staying in the RAT, RAN, or cell SAP(s) that is associated with the inter-RAT cell selection or reselection configuration. In other words, the supporting information for EN-DC operation may be retained, maintained, or kept even if the UE moves out of the SAPs that are associated with the SystemInformationBlockType26a-r15. In some additional implementations, the UE may reuse or reapply all or part of the suspended, kept, or retained SystemInformationBlockType26a-r15 if the UE moves back to the RAT, RAN, or cell SAP(s) that is associated with the SystemInformationBlockType26a-r15.

In some implementations, the mechanisms described above may also be applicable to an IE (e.g., IE(s) in the SystemInformationBlockType26a-r16) while the IE is further associated with one or more RAT, RAN, or cell SAP(s).

In some implementations, the UE may suspend, keep, or retain all or part of the EN-DC measurement results/reports, for example, the measurement results/reports that the UE obtains based on the stored SystemInformationBlockType26a-r16, regardless of whether the UE is or is not staying in the RAT, RAN, or cell SAP(s) that is associated with the SystemInformationBlockType26a-r16. In other words, the EN-DC measurement results/reports may be retained, maintained, or kept even after the UE moves out of the SAPs that are associated with the SystemInformationBlockType26a-r16. In some additional implementations, the UE may reuse or reapply all or part of the suspended, kept, or retained EN-DC measurement results/reports if the UE moves back to the RAT, RAN, or cell SAP(s) that is associated with the SystemInformationBlockType26a-r16.

In some implementations, the UE may reuse or drop all or part of the stored EN-DC measurement results/reports while the UE is out of a RAT, RAN, or cell coverage area. In some implementations, the UE may determine whether to reuse or drop all or part of the stored EN-DC measurement results/reports while the UE transitions between the RAT, RAN, or cell SAP(s) and the RAT, RAN, or cell Unavailable Period(s) that is associated with the SystemInformationBlockType26a-r16.

In some implementations, the mechanisms described above are not limited to EN-DC but may also be applicable to other scenarios, such as Multi-RAT Dual Connectivity (MR-DC), New Radio Dual Connectivity (NR-DC), E-UTRA-NR Dual Connectivity (EN-DC) and NGC-E-UTRA-NR Dual Connectivity (NGEN-DC), and/or NR-E-UTRA Dual Connectivity (NE-DC).

In some implementations, suspension or release of system information may be based on the SAP(s) of serving cell. In some implementations, the UE may suspend the received system information (e.g., MIB, SIB1, SIB19, and/or other SI) of a cell (e.g., Cell #1) while the UE moves out of the (e.g., cell) SAP of the serving cell (e.g., cell #1). In some such implementations, while the UE re-selects to the cell (e.g., Cell #1), the UE may try to resume the stored system information, for example, after checking the value tag of the broadcasting system information to ensure that the stored SIB(s) is still valid.

In some other implementations, the UE may release the received system information (e.g., MIB, SIB1, SIB19, and/or other SI) while the UE moves out of the (e.g., cell) SAP of the serving cell.

In some implementations, a UE may receive the SAP-related information from a corresponding serving cell via broadcasting system information. In some implementations, the serving cell may be the Master Node to the UE. In some other implementations, the serving cell may be the Secondary Node to the UE while the UE is configured with Dual-Connectivity (e.g., EN-DC, NR-DC, NG-ENDC).

In some implementations, the UE may deliver a System Information Request message (e.g., a request for an NTN-specific SIB or a SIB that contains NTN configuration of the serving cell and/or neighboring cells) via a random access procedure (e.g., a 2-step RA procedure or a 4-step RA procedure) to the serving cell. For example, the UE may transmit an SI Request message via MSG3 transmission during a 4-step RA procedure or via MSGA transmission during a 2-step RA procedure. In some such implementations, the serving cell of the UE may broadcast the requested SI after receiving the SI Request message from the UE.

In some implementations, the UE (e.g., UE in an RRC Connected state) may deliver UE-specific UL control signaling (e.g., DedicatedSIBRequest message) to a corresponding serving cell for system information enquiry. In some such implementations, after receiving the DedicatedSIBRequest message, the serving cell may transmit the SIB(s) that is requested by the UE via another UE-specific DL control signaling (e.g., RRCReconfiguration message) to the UE.

Figure 3:
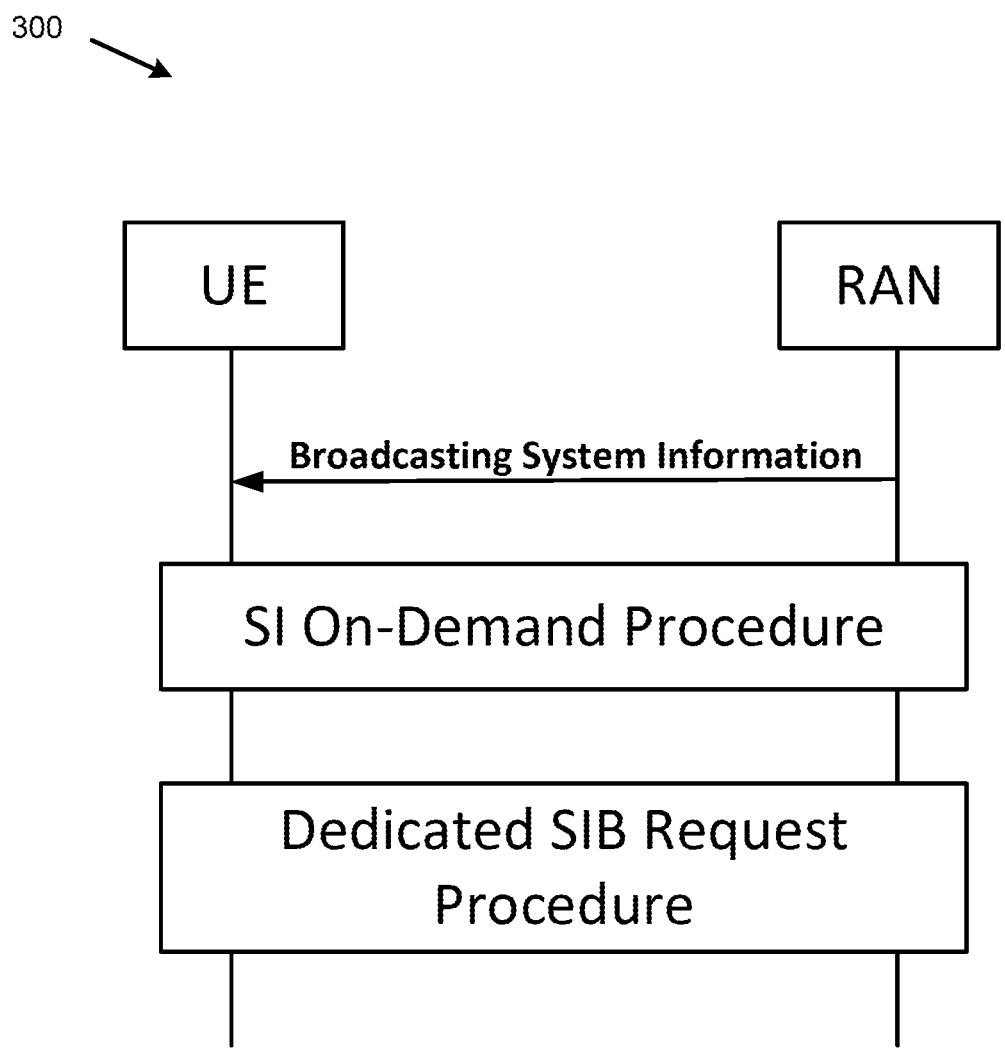
FIG. 3 is a diagram illustrating reception of system information, according to an example implementation of the present disclosure.

FIG. 3 is a diagram illustrating reception of system information, according to an example implementation of the present disclosure. It should be noted that although actions in this and other Figures are illustrated as separate actions represented as independent blocks, these separately delineated actions should not be construed as necessarily order dependent. The order in which the actions are performed is not intended to be construed as a limitation, and any number of the disclosed blocks may be combined in any order to implement the method, or an alternate method. Moreover, one or more of the actions may be omitted in some of the present implementations. In some implementations, the mechanisms described above may be applicable to the system information which may be delivered via broadcasting, SI on-demand procedure, or UE-specific dedicated Control signaling as shown in FIG. 3.

In some implementations, the RAN may include base stations from TN and/or NTN.

In some implementations, the RAN may include at least one of E-UTRA Cell, NR Cell, and NB-IoT Cell.

Service Available Periods (SAPs) for SMTC Configurations

In some implementations, the SAP configuration may be provided for Synchronization Signal/Physical Broadcast Channel Block Measurement Timing Configuration (SMTC) Configuration.

In some implementations, three different types of SMTC configurations may be configured, as shown in Table 6 below.

associated with a RAT SAP, for example, while the SMTC configuration is configured to be associated with at least one frequency carrier in a Measurement Object, such as MeasObjectNR, and the frequency carrier may be associated with NR RAT.

In some implementations, an SMTC configuration may be further associated with a RAN SAP.

In some implementations, the UE may not apply the received configuration if the UE is not staying in the RAN SAP(s) that is associated with the SMTC configuration.

In some implementations, a Synchronization Signal Block-Measurement Timing Configuration (SSB-MTC) may be configured with one or more physical cell identities (e.g., PhysCellId, which may be included in the pci-List).

In some other implementations, one or more PhysCellId in the pci-List may be associated with a Cell Service Available Period (Cell SAP).

In some implementations, the UE may try to search for the PhysCellId(s) that is based on the given SMTC configuration only during the Cell SAP(s).

In some implementations, the UE may not try to search for the PhysCellId based on the given SMTC configuration while the UE is out of a RAT, RAN, or cell coverage area. In other implementations, the UE may not try to search for the PhysCellId based on the given SMTC configuration during the Unavailable Period(s) that is associated with the PhysCellId(s).

TABLE 6

SSB-MTC
The IE SSB-MTC is used to configure measurement timing configurations, i.e., timing occasions at which the UE measures SSBs.
SSB-MTC information element
(Type 1) SSB-MTC ::= SEQUENCE {
periodicityAndOffset CHOICE {
sf5 INTEGER (0...4),
sf10 INTEGER (0...9),
sf20 INTEGER (0...19),
sf40 INTEGER (0...39),
sf80 INTEGER (0...79),
sf160 INTEGER (0...159)},
duration ENUMERATED { sf1, sf2, sf3, sf4, sf5 }}
(Type 2) SSB-MTC2 ::= SEQUENCE {
pci-List SEQUENCE (SIZE (1...maxNrofPCIsPerSMTC)) OF PhysCellId OPTIONAL, -- Need M
periodicity ENUMERATED {sf5, sf10, sf20, sf40, sf80, spare3, spare2, spare1}
}
SSB-MTC2-LP-r16 ::= SEQUENCE {
pci-List SEQUENCE (SIZE (1...maxNrofPCIsPerSMTC)) OF PhysCellId OPTIONAL, -- Need R
periodicity ENUMERATED {sf10, sf20, sf40, sf80, sf160, spare3, spare2, spare1}
}
(Type 3) SSB-MTC3 ::= SEQUENCE {
periodicityAndOffset CHOICE {
sf5-r16 INTEGER (0...4),
sf10-r16 INTEGER (0...9),
sf20-r16 INTEGER (0...19),
sf40-r16 INTEGER (0...39),
sf80-r16 INTEGER (0...79),
sf160-r16 INTEGER (0...159),
sf320-r16 INTEGER (0...319),
sf640-r16 INTEGER (0...639),
sf1280-r16 INTEGER (0...1279)
},
Duration. ENUMERATED {sf1, sf2, sf3, sf4, sf5},
pci-List. SEQUENCE (SIZE (1...maxNrofPCIsPerSMTC)) OF PhysCellId OPTIONAL, --
Need M
ssb-ToMeasure SetupRelease { SSB-ToMeasure } OPTIONAL -- Need M
}

In some implementations, an SMTC configuration (e.g., Type 1/Type 2/type 3 SMTC configuration) may be further In some implementations, if the SS/PBCH block measurement timing configuration (SMTC) configuration is provided by a NW, the UE may perform the SSB/CSI-RS measurement within the provided SMTC window.

In some implementations, the UE may suspend an SMTC configuration if the UE is not staying in the SAP(s) that is associated with the SMTC configuration. In some other implementations, the UE may reuse or reapply the suspended SMTC configuration if the UE moves back to the SAP(s) that is associated with the SMTC configuration.

In some implementations, the UE may release an SMTC configuration if the UE is not staying in the SAP(s) that is associated with the SMTC configuration.

In some implementations, the SAP may be associated with one or more new offset(s) in addition to the legacy SMTC configuration, for example, the UE may apply a new offset after the start of the SAP time duration (e.g., [t1, t2]). In some implementations, one or more SMTC configuration(s) that is associated with a frequency may be configured by a NW. In some implementations, the SMTC configuration may be associated with a set of cells. In some implementations, multiple SMTC configurations may be enabled by introducing different new offsets in addition to the legacy SMTC configuration.

Measurement Object Configuration

In some implementations, the SAP configuration may be associated with Measurement Object configurations.

In some implementations, the UE may be configured with a measurement object configuration (e.g., MeasObjectNR). The IE MeasObjectNR may specify information applicable for SS/PBCH block(s) intra- or inter-frequency measurements and/or CSI-RS intra- or inter-frequency measurements. See, for example, Table 7 below.

In some implementations, the MeasObjectNR (e.g., or some Information Elements in the MeasObjectNR) may be associated with one or more RAT SAP, for example, while the MeasObjectNR configuration is configured to be associated with at least one frequency carrier in a Measurement Object (e.g., MeasObhectNR) and the frequency carrier may be associated with an NR RAT. In some such implementations, Received Signal Strength Indicator Measurement Timing Configuration (RMTC) configuration in the MeasObjectNR may be further associated with an rmtc-Frequency information, which may be presented by ARFCN-value NR, such that the UE may apply the RMTC configuration only during the (e.g., RAT) SAPs. In other implementations, the UE may not apply the RMTC configuration while the UE is out of the given RAT SAPs.

In some implementations, the MeasObjectNR (e.g., or some Information Elements in the MeasObjectNR) may be associated with one or more RAT SAP, for example, while the MeasObjectNR configuration is configured to be associated with at least one frequency carrier in a Measurement Object (e.g., MeasObhectNR) and the frequency carrier may be associated with an NR RAT.

In some implementations, the MeasObjectNR may be associated with one or more cell SAP.

In some implementations, the Measurement Objects may include one or more cell identity list (e.g., cellsToAddModList and/or whiteCellsToAddModList). In some such implementations, one or more cells included in the cell identity list may be further associated with one or more cell SAP(s).

In some implementations, the UE may try to apply the configured MeasObjectNR that is related to a cell, for example, the smtc2/smtc3 configuration associated with a

TABLE 7

(TS 38.331)
MeasObjectNR ::= SEQUENCE {
ssbFrequency   ARFCN-ValueNR OPTIONAL, --              Cond SSBorAssociatedSSB
ssbSubcarrierSpacing SubcarrierSpacing OPTIONAL, --        Cond SSBorAssociatedSSB
smtc1 SSB-MTC OPTIONAL, --                    Cond SSBorAssociatedSSB
smtc2 SSB-MTC2 OPTIONAL, --                   Cond IntraFreqConnected
refFreqCSI-RS ARFCN-ValueNR OPTIONAL, --            Cond CSI-RS
referenceSignalConfig ReferenceSignalConfig,
absThreshSS-BlocksConsolidation ThresholdNR.           OPTIONAL, -- Need R
absThreshCSI-RS-Consolidation ThresholdNR           OPTIONAL, -- Need R
nrofSS-BlocksToAverage INTEGER (2...maxNrofSS-BlocksToAverage)
OPTIONAL, -- Need R
nrofCSI-RS-ResourcesToAverage INTEGER (2...maxNrofCSI-RS-ResourcesToAverage)
OPTIONAL, -- Need R
quantityConfigIndex INTEGER (1...maxNrofQuantityConfig),
offsetMO Q-OffsetRangeList,
cellsToRemoveList PCI-List                   OPTIONAL, -- Need N
cellsToAddModList CellsToAddModList            OPTIONAL, -- Need N
blackCellsToRemoveList PCI-RangeIndexList         OPTIONAL, -- Need N
blackCellsToAddModList SEQUENCE (SIZE (1...maxNrofPCI-Ranges)) OF PCI-
RangeElement
OPTIONAL, -- Need N
whiteCellsToRemoveList PCI-RangeIndexList            OPTIONAL, -- Need N
whiteCellsToAddModList SEQUENCE (SIZE (1...maxNrofPCI-Ranges)) OF PCI-
RangeElement    OPTIONAL, -- Need N
...,
[[
freqBandIndicatorNR FreqBandIndicatorNR            OPTIONAL, -- Need R
measCycleSCell ENUMERATED {sf160, sf256, sf320, sf512, sf640, sf1024, sf1280}.
OPTIONAL -- Need R
]],
}

In some implementations, the mechanisms described above are not limited to the MeasObjectNR but may also be applicable to the Measurement Objects of other RATs (e.g., E-UTRA).

PCI list in the MeasOBjectNR; measCycleSCell, which may be configured only when at least one Scell is configured on such frequency carrier, only during the SAP associated with the cell.

In some implementations, regarding cell-specific smtc3 configuration, if smtc3 list is present for cells indicated in the pci-List parameter in each SSB-MTC3 element of the list in the same MeasObjectNR, the Integrated Access and Backhaul Mobile Termination (IAB-MT) may setup an additional SS block measurement timing configuration in accordance with the received periodicityAndOffset parameter, for example, using the same condition as smtc1 to identify the SFN and the subframe for SMTC occasion, in each SSB-MTC3 configuration and then may use the duration and ssb-ToMeasure parameters from each SSB-MTC3 configuration.

In some implementations, regarding measCycleSCell, the parameter may be used only when an Scell is configured on the frequency indicated by the measObjectNR and is in a deactivated state. See TS 38.133 [14]. In some implementations, the gNB may configure the parameter whenever an Scell is configured on the frequency that is indicated by the measObjectNR, Additionally, this field may also be signaled when an Scell is not configured. In some implementations, a value sf160 may correspond to 160 sub-frames, a value sf256 may correspond to 256 sub-frames and so on. In some such implementations, the Scell may be further associated with at least one Cell SAP(s).

In some implementations, the UE may try to apply the configured MeasObjectNR only during the configured SAP (s).

In other implementations, the UE may not try to apply the configured MeasObjectNR only during the configured SAP (s).

In some implementations, the UE may be configured with multiple measurement objects on a frequency carrier. In some such implementations, the SAP(s) that is configured to each measurement object on the concerned frequency carrier may not overlap. In other words, to the concerned frequency carrier, there may be only one active measurement object at a time.

In some other implementations, the SAPs of the measurement objects configured on a frequency carrier may partially overlap, for example, in the time domain.

Figure 4:
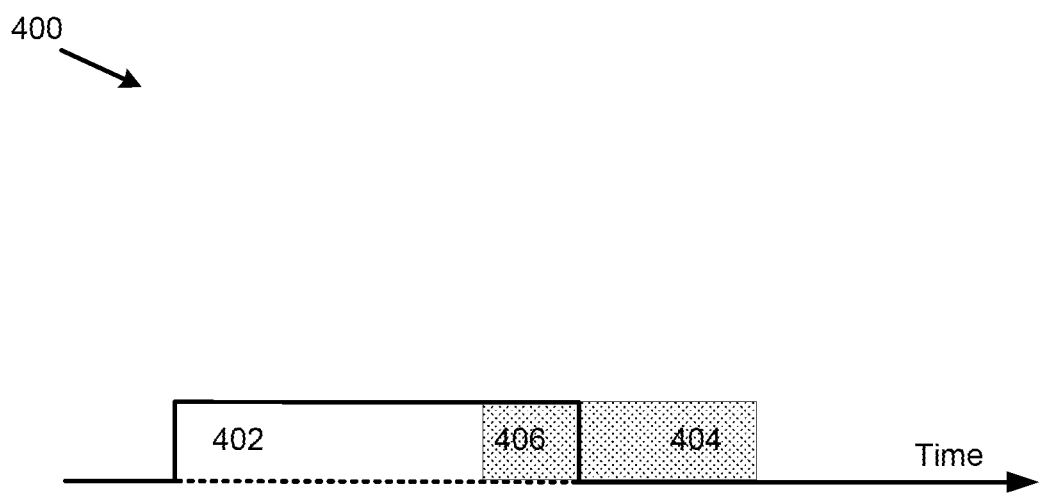
FIG. 4 is a diagram illustrating overlapping of SAP in the time domain, according to an example implementation of the present disclosure.

FIG. 4 is a diagram illustrating overlapping of SAP in the time domain, according to an example implementation of the present disclosure. In some implementations as shown in FIG. 4, the UE may be configured with an RAT, RAN, or cell SAP 402 and another RAT, RAN, or cell SAP 404 on an NR frequency carrier where both the SAP 402 and the SAP 404 have a portion 406 partially overlapped in a time domain. In some implementations, more than one SAP may overlap in the time domain. In some such implementations, the UE may not apply the RAT, RAN, or cell 404 immediately. Instead, the UE may apply the SAP 404 until the SAP 402 expires or until the UE moves to the Service Unavailable Period(s) (e.g., out of coverage area of the serving RAT, RAN, or cell) defined by the SAP 402. In some such implementations, the UE may start a UE measurement based on the SAP 404 after the SAP 402 expires or while the UE moves to the Service Unavailable Period(s) defined by the SAP 402.

In some other implementations, the UE may determine which RAT, RAN, or cell SAPs to apply (e.g., considered as UE implementations) while more than one RAT, RAN, or cell SAPs overlap. In some implementations, the UE may first try to perform a measurement based on the Measurement Object (MO) associated with the SAP 402. In some such implementations, the UE may try to perform measurement based on the MOs that are associated with the SAP 402 and the SAP 404 during the time period that the SAP 402 and the SAP 404 overlap. In some such implementations, the UE may try to perform a measurement only based on the MO associated with the SAP 404.

In some implementations, when the serving RAN configures at least two MOs overlapping in time, an MO may be associated with a RAT, RAN, or cell SAP and another MO may not be configured with any RAT, RAN, or cell SAP. In some such implementations, the UE may prioritize to perform a measurement based on the non-SAP MO, for example, for Idle mode cell reselection, an NTN UE may prioritize TN over NTN.

In some implementations, the SAP configuration and the UE implementations towards the MO configuration may also be applicable to other mechanisms, such as measurement/report configuration (e.g., a measurement/report configuration on one or more target frequency carrier(s) may be associated with a RAT, RAN, or cell SAP), report configuration (e.g., a report configuration on one or more target frequency carrier(s) may be associated with a RAT, RAN, or cell SAP), and measurement gap configuration.

Figure 5:
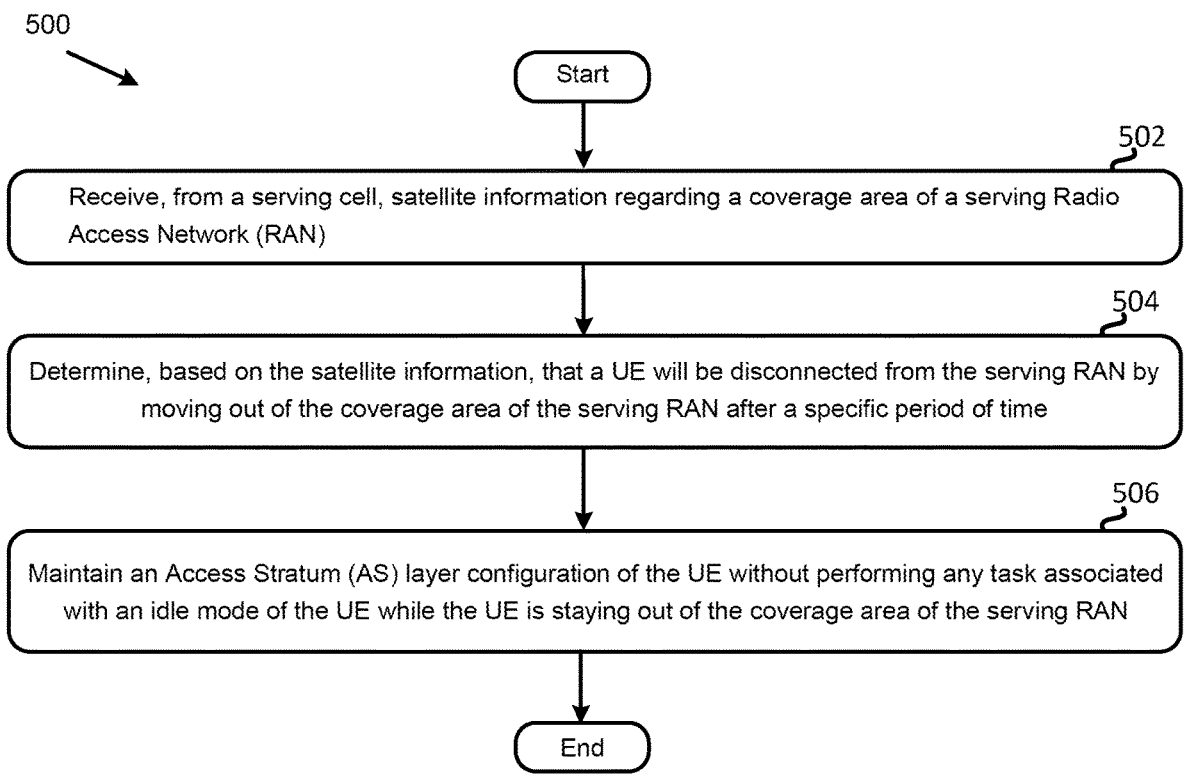
FIG. 5 is a flowchart illustrating a method or process for a UE to determine timing information regarding the SAP of a service cell implemented via an NTN, according to an example implementation of the present disclosure.

FIG. 5 is a flowchart illustrating a method or process 500 for a UE to determine timing information regarding the SAP of a service cell that is implemented via an NTN, according to an example implementation of the present disclosure. As illustrated in FIG. 5, process 500 may start, in action 502, by receiving, from a serving cell, satellite information (e.g., ephemeris information, orbit information, velocity information) regarding a coverage area of a serving Radio Access Network (RAN). After receiving the satellite information, the UE, in action 504, may determine, based on the satellite information, that the UE will be disconnected from the serving RAN by moving out of the coverage area of the serving RAN after a specific period of time. In some such implementations, the satellite information may be associated with a satellite that configures the serving cell of the UE and may include at least one of a RAN, RAT, or cell service available period, and a RAN, RAT, or cell service unavailable period.

In some implementations, the UE may implement an Idle mode while the UE is out of a coverage area of the serving RAN, RAT, or cell in an NTN. After the UE determined to be disconnected from the serving RAN, the UE may maintain, in action 506, an Access Stratum (AS) layer configuration of the UE without performing any task associated with an Idle mode of the UE while the UE is staying out of the coverage area of the serving RAN. In some implementations, the AS layer configuration may include one or more cell selection priorities associated with one or more frequency carriers, the UE-specific control signaling may include a radio resource control (RRC) Release message, and the RRC Release message may instruct the UE to move to the Idle mode. In some implementations, the AS layer configuration may further include UE inactive AS context, and the UE inactive AS context may be stored at the UE after receiving the RRC Release message.

In some implementations, maintaining the AS layer configuration may include maintaining an Inactive state context for the AS layer that is stored at the UE. In some such implementations, the one or more cell selection priorities may include priority information for selecting, while the UE is in the Idle mode, a second serving cell to connect to the NTN. In some such implementations, the second serving cell may be associated with a second satellite of the NTN. In some such implementations, the second satellite may be different from a first satellite of the NTN that is associated with the serving cell.

In some implementations, maintaining the AS layer configuration may include maintaining an Inactive state context for the AS layer that is stored at the UE. The one or more cell selection priorities, in some such implementations, may include priority (e.g., with/without sub-priority) information for selecting, while the UE is in the Idle mode, a second serving cell to connect to a Terrestrial Network (TN). The second serving cell may be associated with a base station of the TN (e.g., and not the original (or first) base station associated with the NTN). The base station of the TN may not be associated with the satellite of the NTN (e.g., that is associated with the serving cell). Please also note that, in some implementations, a TN or an NTN may share the same frequency carrier and as such, in some implementations, different priority (and sub-priority) values may be configured for the same frequency carrier. For example, a first priority value may be associated with the TN selection and a second (different) priority value may be associated with the NTN selection. In some implementations, one priority value (e.g., associated with the same frequency carrier) may be applied for both TN and NTN cell (re)selection.

In some implementations, the Idle mode may include one of an E-UTRA or NR RRC Inactive state and an E-UTRA or NR RRC Idle state. In some implementations, a task that is associated with the Idle mode of the UE may include a task that is associated with an E-UTRA RAT or a task that is associated with a New Radio RAT.

In some implementations, after the UE maintains the AS layer configuration of the UE in action 506, the process 500 may end. In some implementations, after or before the UE maintains the AS layer configuration of the UE in action 506, the UE may receive the AS layer configuration via UE-specific control signaling before the UE moves out of the coverage area of the serving RAN.

In some implementations, after or before the UE maintains the AS layer configuration of the UE in action 506, the UE may receive the AS layer configuration via UE-specific control signaling, then the UE may store the AS layer configuration, which may include at least one of a log measurement configuration (also known as logged measurement configuration in some technical specifications) or log measurement results (also known as logged measurement results in some technical specifications) before moving out of the coverage area of the serving RAN.

In some additional implementations, the UE may be configured with one loggingDuration as part of the log measurement configuration. Then, after receiving the log measurement configuration with loggingDuration, the UE may start to count a timer T330 to zero by setting the initial value of T330=loggingDuration. UE may implement log measurement (or logged measurement) based on the log measurement configuration while the timer T330 is counting. The UE may then stop logging measurements (e.g., and may then drop/release the stored log measurement configuration) when the timer T330 expires. In some additional implementations, the UE may be allowed to drop/release the stored log measurement results after a specific period (e.g., 48 hours after the configured T330 expires). As such, to prevent the UE from releasing the stored log measurement configuration (e.g., and the log measurement results) during the service unavailable period of the serving RAN, in some implementations, the UE may stop counting the timer T330 during the (RAT/RAN/Cell) Service Unavailable Periods. In addition, the UE may recount the stopped T330 to zero during the (RAT/RAN/Cell) Service Available Periods. As a result, in some implementations, the UE may stop implementing the logging of measurements (e.g., based on the stored log measurement configuration) during the (RAT/RAN/Cell) Service Unavailable Periods. The UE may then resume logging the measurements (e.g., and also resume the T330 counting procedure) when the UE moves back to the (RAT/RAN/Cell) Available Periods again. It should be noted that, in some implementations, the UE may keep counting the timer T330 during the (RAT/RAN/Cell) Service Unavailable Periods and then the UE may release/drop the stored log measurement configuration after the T330 expires during the (RAT/RAN/Cell) Service Unavailable Periods (e.g., the stored log measurement result may or may not be released/dropped under such a scenario).

In some implementations, after or before the UE maintains the AS layer configuration of the UE in action 506, the UE may determine how to implement one or more timers (e.g., T380 in RNAU procedure, T320 in cell (re)selection procedure, T330 in log measurement procedure, and T331 in idle/inactive measurement procedure) associated with the Idle mode of the UE while the UE is staying out of the coverage area of the serving RAN.

In some implementations, after or before the UE maintains the AS layer configuration of the UE in action 506, the UE may perform at least one task associated with the Idle mode of the UE after moving to another coverage area of the serving RAN. In some implementations, the UE and the serving RAN (e.g., including the coverage area of the serving RAN) may be under the coverage area of the NTN whether or not a satellite is changed to another satellite. That is, in some implementations, a serving RAN's coverage area may include the sum of coverage areas of all the satellites that are associated with the same NTN. In some implementations, the Idle mode task may include a RAN notification Area Update procedure.

Figure 6:
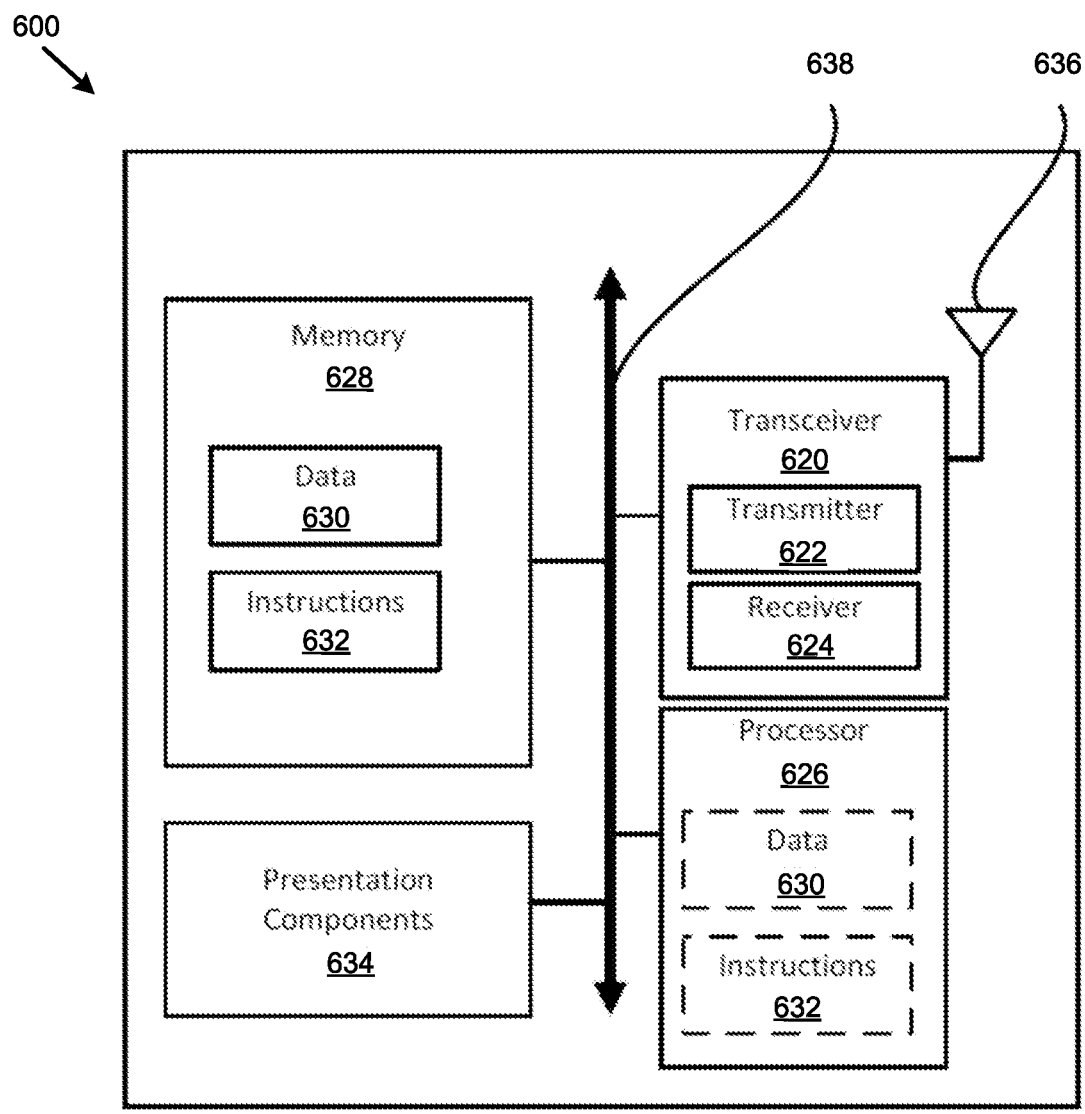
FIG. 6 is a block diagram illustrating a node for wireless communication, according to an example implementation of the present disclosure.

In some implementations of the present disclosure, the method and functions described with reference to FIGS. 1-5 may be implemented by a node, such as the node 600 depicted in FIG. 6. FIG. 6 is a block diagram illustrating a node 600 for wireless communication, according to one example implementation of the present disclosure. As shown in FIG. 6, the node 600 may include a transceiver 620, a processor 626, a memory 628, one or more presentation components 634, and at least one antenna 636. The node 600 may also include a Radio Frequency (RF) spectrum band module, a base station communications module, a network communications module, and a system communications management module, input/output (I/O) ports, I/O components, and a power supply (not explicitly shown in FIG. 6) in which each of the components above may be in communication with each other, directly or indirectly, over one or more buses 638.

The transceiver 620 may include a transmitter 622 and a receiver 624 configured to transmit and/or receive time and/or frequency resource partitioning information. In some implementations, the transceiver 620 may be configured to transmit in different types of subframes and slots including, but not limited to, usable, non-usable and flexibly usable subframes and slot formats. The transceiver 620 may be configured to receive data and control signaling.

The node 600 may include a variety of computer-readable media. Computer-readable media may be any available media accessible by the node 600 and include both volatile and non-volatile media, removable and non-removable media. By way of example, and not limitation, computer-readable media may include computer storage media and communication media. Computer storage media may include both volatile and non-volatile, removable and non-removable media implemented in any method or technology for storage of information, such as computer-readable instructions, data structures, program modules or other data.

Computer storage media may include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not include a propagated data signal. Communication media may embody computer-readable instructions, data structures, program modules or other data in a modulated data signal such as a carrier wave or other transport mechanism and includes any information delivery media. The term "modulated data signal" may be a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 628 may include computer-storage media in the form of volatile and/or non-volatile memory. The memory 628 may be removable, non-removable, or a combination thereof. Exemplary memory may include solid-state memory, hard drives, optical-disc drives, etc. As illustrated in FIG. 6, the memory 628 may store computer-readable, computer-executable instructions 632 (e.g., software codes) that are configured to, when executed, cause the processor 626 to perform various functions described herein, for example, with reference to FIGS. 2-5. Alternatively, instructions 632 may not be directly executable by the processor 626 but be configured to cause the node 600 (e.g., when compiled and executed) to perform various functions described herein.

The processor 626 may include an intelligent hardware device, for example, a central processing unit (CPU), a microcontroller, an ASIC, etc. The processor 626 may include memory. The processor 626 may process data 630 and instructions 632 received from the memory 628, and information through the transceiver 620, the base band communications module, and/or the network communications module. The processor 626 may also process information to be sent to the transceiver 620 for transmission through the antenna 636, and further to the network communications module for transmission to a core network.

The one or more presentation components 634 may present data indications to a person or other device. For example, the one or more presentation components 634 may include a display device, speaker, printing component, vibrating component, etc.

From the above description it is manifest that various techniques can be used for implementing the concepts described in the present disclosure without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present disclosure is not limited to the particular implementations described above, but many rearrangements, modifications, and substitutions are possible without departing from the scope of the present disclosure.

What is claimed is:

1. A method for a user equipment (UE) connected to a serving Radio Access Network (RAN) through a first serving cell, the serving RAN comprising a Non-Terrestrial Network (NTN), the method comprising:
receiving, from the first serving cell, satellite information regarding a coverage area of the serving RAN;
determining, based on the satellite information, that the UE will be disconnected from the serving RAN by moving out of the coverage area of the serving RAN after a specific period of time; and
maintaining an Access Stratum (AS) layer configuration of the UE, wherein the UE forgoes performing tasks associated with an Idle mode of the UE while the UE is staying out of the coverage area of the serving RAN and is disconnected from the serving RAN, the tasks associated with the Idle mode of the UE comprising at least a RAN notification area update procedure.

2. The method of claim 1, wherein the satellite information is associated with a satellite that configures the first serving cell of the UE and indicates at least one of:
a RAN or Radio Access Technology (RAT) or cell service available period, and
a RAN or RAT or cell service unavailable period.

3. The method of claim 1, further comprising receiving, from the first serving cell, the AS layer configuration via UE-specific control signaling before the UE moves out of the coverage area of the serving RAN.

4. The method of claim 3, wherein:
the AS layer configuration comprises one or more cell selection priorities associated with one or more frequency carriers,
the UE-specific control signaling comprises a radio resource control (RRC) Release message, and
the RRC Release message instructs the UE to move to the Idle mode.

5. The method of claim 4, wherein:
the AS layer configuration further comprises UE inactive AS layer context, and
the UE inactive AS layer context is stored at the UE after receiving the RRC Release message.

6. The method of claim 4, wherein:
maintaining the AS layer configuration comprises maintaining an Inactive state context for the AS layer that is stored at the UE,
the one or more cell selection priorities comprise priority information for selecting, while the UE is in the Idle mode, a second serving cell to connect to the NTN,
the first serving cell is associated with a first satellite of the NTN, and
the second serving cell is associated with a second satellite of the NTN, which is different from the first satellite of the NTN.

7. The method of claim 1, further comprising:
receiving the AS layer configuration via UE-specific control signaling; and
storing the AS layer configuration, which comprises at least one of a log measurement configuration or log measurement results, before moving out of the coverage area of the serving RAN.

8. The method of claim 1, further comprising determining how to implement one or more timers associated with the Idle mode of the UE while the UE is staying out of the coverage area of the serving RAN.

9. The method of claim 1, further comprising:
performing at least one idle mode task associated with the Idle mode of the UE after moving to another coverage area of the serving RAN and connecting back with the serving RAN, wherein the Idle mode task of the UE further comprises a cell selection or reselection procedure.

10. The method of claim 1, wherein:
the Idle mode comprises one of (i) an Evolved-Universal Terrestrial Radio Access (E-UTRA) or New Radio (NR) Radio Resource Control (RRC) Inactive state and (ii) an E-UTRA or NR RRC Idle state, and
a task associated with the Idle mode of the UE further comprises a task associated with an E-UTRA Radio Access Technology (RAT) or a task associated with an NR RAT.

11. A user equipment (UE) connected to a satellite through a non-terrestrial network (NTN), the UE comprising:
one or more non-transitory computer-readable media storing one or more computer-executable instructions; and
at least one processor coupled to the one or more non-transitory computer-readable media, and configured to execute the one or more computer-executable instructions to cause the UE to:
receive, from a first serving cell, satellite information regarding a coverage area of a serving Radio Access Network (RAN) comprising the NTN;
determine, based on the satellite information, that the UE will be disconnected from the serving RAN by moving out of the coverage area of the serving RAN after a specific period of time; and
maintain an Access Stratum (AS) layer configuration of the UE, wherein the UE forgoes performing tasks associated with an Idle mode of the UE while the UE is staying out of the coverage area of the serving RAN and is disconnected from the serving RAN, the tasks associated with the Idle mode of the UE comprising at least a RAN notification area update procedure.

12. The UE of claim 11, wherein the satellite information is associated with a satellite that configures the first serving cell of the UE and indicates at least one of:
a RAN or Radio Access Technology (RAT) or cell service available period, and
a RAN or RAT or cell service unavailable period.

13. The UE of claim 11, wherein the at least one processor is further configured to execute the one or more computer-executable instructions to cause the UE to receive, from the first serving cell, the AS layer configuration via UE-specific control signaling before the UE moves out of the coverage area of the serving RAN.

14. The UE of claim 13, wherein:
The AS layer configuration comprises one or more cell selection priorities associated with one or more frequency carriers,
the UE-specific control signaling comprises a radio resource control (RRC) Release message, and
the RRC Release message instructs the UE to move to the Idle mode.

15. The UE of claim 14, wherein:
the AS layer configuration further comprises UE inactive AS context, and
the UE inactive AS context is stored at the UE after receiving the RRC Release message.

16. The UE of claim 14, wherein:
maintaining the AS layer configuration comprises maintaining an Inactive state context for the AS layer that is stored at the UE,
the one or more cell selection priorities comprise priority information for selecting, while the UE is in the Idle mode, a second serving cell to connect to the NTN,
the first serving cell is associated with a second satellite of the NTN, and
the second serving cell is associated with a second satellite of the NTN, which is different from the first satellite of the NTN.

17. The UE of claim 11, wherein the at least one processor is further configured to execute the one or more computer-executable instructions to cause the UE to:
receive the AS layer configuration via UE-specific control signaling; and
store the AS layer configuration, which comprises at least one of a log measurement configuration or log measurement results, before moving out of the coverage area of the serving RAN.

18. The UE of claim 11, wherein the at least one processor is further configured to execute the one or more computer-executable instructions to cause the UE to determine how to implement one or more timers associated with the Idle mode of the UE while the UE is staying out of the coverage area of the serving RAN.

19. The UE of claim 11, wherein the at least one processor is further configured to execute the one or more computer-executable instructions to cause the UE to perform at least one task associated with the Idle mode of the UE after moving to another coverage area of the serving RAN and connecting back with the serving RAN, wherein the Idle mode task of the UE further comprises a cell selection or reselection procedure.

20. The UE of claim 11, wherein:
the Idle mode comprises one of (i) an Evolved-Universal Terrestrial Radio Access (E-UTRA) or New Radio (NR) Radio Resource Control (RRC) Inactive state and (ii) an E-UTRA or NR RRC Idle state, and
a task associated with the Idle mode of the UE further comprises a task associated with an E-UTRA Radio Access Technology (RAT) or a task associated with an NR RAT.

* * * * *